United States Patent
Machida

(10) Patent No.: US 7,743,034 B2
(45) Date of Patent: Jun. 22, 2010

(54) DOCUMENT MANAGEMENT METHOD, NETWORK SYSTEM, AND INFORMATION PROCESSING APPARATUS

(75) Inventor: Haruo Machida, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 574 days.

(21) Appl. No.: 11/084,048

(22) Filed: Mar. 21, 2005

(65) Prior Publication Data
US 2005/0210032 A1 Sep. 22, 2005

(30) Foreign Application Priority Data
Mar. 22, 2004 (JP) ............................. 2004-082931

(51) Int. Cl.
*G06F 17/30* (2006.01)
(52) U.S. Cl. ..................... 707/662; 707/689; 707/758
(58) Field of Classification Search .................. None
See application file for complete search history.

(56) References Cited

U.S. PATENT DOCUMENTS

| | | | | |
|---|---|---|---|---|
| 5,161,214 | A * | 11/1992 | Addink et al. ................... | 707/1 |
| 5,680,612 | A * | 10/1997 | Asada et al. ..................... | 707/3 |
| 6,978,284 | B2 * | 12/2005 | McBrearty et al. .............. | 707/206 |
| 2001/0002933 | A1 * | 6/2001 | Satoh ........................... | 382/124 |
| 2002/0026353 | A1 * | 2/2002 | Porat et al. ..................... | 705/14 |
| 2002/0087602 | A1 * | 7/2002 | Masuda et al. .................. | 707/515 |
| 2002/0099622 | A1 * | 7/2002 | Langhammer ................... | 705/26 |
| 2003/0033333 | A1 * | 2/2003 | Nishino et al. ................... | 707/531 |
| 2003/0083961 | A1 * | 5/2003 | Bezos et al. ..................... | 705/27 |
| 2003/0126126 | A1 * | 7/2003 | Lee et al. ........................ | 707/3 |
| 2003/0182332 | A1 * | 9/2003 | McBrearty et al. .............. | 707/206 |

FOREIGN PATENT DOCUMENTS

| | | | |
|---|---|---|---|
| EP | 1102188 B1 | 12/2006 | |
| JP | 08-272822 | * 10/1996 | ................... 707/1 |
| JP | 2001147920 A | 5/2001 | |
| JP | 2002041964 A | 2/2002 | |
| JP | 2002150152 A | 5/2002 | |
| JP | 2003030287 A | 1/2003 | |
| JP | 2003-76924 | 3/2003 | |
| JP | 2003168051 A | 6/2003 | |
| JP | 2004054540 A | 2/2004 | |

OTHER PUBLICATIONS

Japanese Office Action dated Jun. 1, 2009 in corresponding Japanese Application No. 2004-082931.
Japanese Office Action dated Aug. 17, 2009 in corresponding Japanese Application No. 2004-082931.

* cited by examiner

*Primary Examiner*—Neveen Abel Jalil
*Assistant Examiner*—Son T Hoang
(74) *Attorney, Agent, or Firm*—Fitzpatrick, Cella, Harper & Scinto

(57) ABSTRACT

In a network system including a server apparatus, client apparatus, and database, when a registration request of catalog data of a catalog is received from the client apparatus, the catalog data is registered in the database as one file of the catalog. When a registration request of merchandise information to be associated with the catalog data is received from the client apparatus, the merchandise information is registered as one page of the catalog data. Hence, the merchandise information of the catalog can be associated with catalog data of each page.

11 Claims, 23 Drawing Sheets

FIG. 21

DOCUMENT MANAGEMENT METHOD, NETWORK SYSTEM, AND INFORMATION PROCESSING APPARATUS

FIELD OF THE INVENTION

The present invention relates to a technique of managing documents (catalogs) in a network system.

BACKGROUND OF THE INVENTION

Systems which register catalogs in a database and manage them have been proposed recently. For example, in patent reference 1 (Japanese Patent Laid-Open No. 2003-76924), collected catalogs are registered in a database. In accordance with search conditions, a desired catalog can be found and browsed from those registered in the database.

However, if a catalog about, e.g., tours in Kyushu is registered, a Fukuoka course, Kumamoto course, Nagasaki course, and the like are included in the catalog. In addition, schedules and optional information common to these courses are also often contained together. In patent reference 1, such a tour catalog is registered in the database as one catalog file. In browsing, each catalog is downloaded.

However, since a catalog file which is actually found and downloaded from the database contains even the data of courses unnecessary for the user, the file download takes a long time. In addition, since the unwanted data are contained, it is difficult for the user to find desired information after the download.

The efficiency becomes lower if course information desired by the user is contained in a plurality of catalog files.

Furthermore, a result obtained by narrowing a number of tour courses to desired courses cannot be saved on a predetermined server apparatus. For this reason, examination results in the past cannot be referred to later.

SUMMARY OF THE INVENTION

The present invention has been made to solve the above problems, and has as its object to register and manage documents (catalogs) to acquire them divisionally for a predetermined unit (e.g., for each page).

In order to achieve the above object, according to an aspect of the present invention, there is provided a document management method comprising:

a document registration step of, when a registration request of a document file is received, registering in a database the document file which is divided into document data of a predetermined block; and a step of associating information to be used for search with one or a plurality of document data of the predetermined block and registering and managing the information.

According to another aspect of the present invention, there is provided an information processing apparatus comprising:

document registration means for, when a registration request of a document file is received, registering in a database the document file which is divided into document data of a predetermined block; and means for associating information to be used for search with one or a plurality of document data of the predetermined block and registering and managing the information.

According to still another aspect of the present invention, there is provided a network system including a server apparatus, a client apparatus, and a database, which are connected through a network, comprising:

document registration means for, when a registration request of a document file is received from the client apparatus, registering in the database the document file which is divided into document data of a predetermined block; and means for associating information to be used for search with one or a plurality of document data of the predetermined block on the basis of an instruction from the client apparatus and registering and managing the information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 21 is a view showing an example of a window 2101 to input a file output instruction for selected merchandise information;

DETAILED DESCRIPTION OF THE PREFERRED EMBODIMENT

The preferred embodiment of the present invention will be described below in detail with reference to the accompanying drawings. In this embodiment, a catalog is defined as a catalog file that comprises one or a plurality of catalog data, the catalog data including at least one page (page catalog data). In, e.g., a tour catalog, pieces of information including the promoter, tour brand name, area, expiration date, and comment can be set as catalog information in association with catalog data.

In, e.g., a tour catalog, if the target area is Kyushu, catalog data corresponds to courses such as a Fukuoka course, Kumamoto course, and Nagasaki course. Pieces of merchandise information (e.g., course name, promoter, departure point, and period) are associated with the catalog data for each page. The catalog data can be registered in the database as one file.

Figure 1:
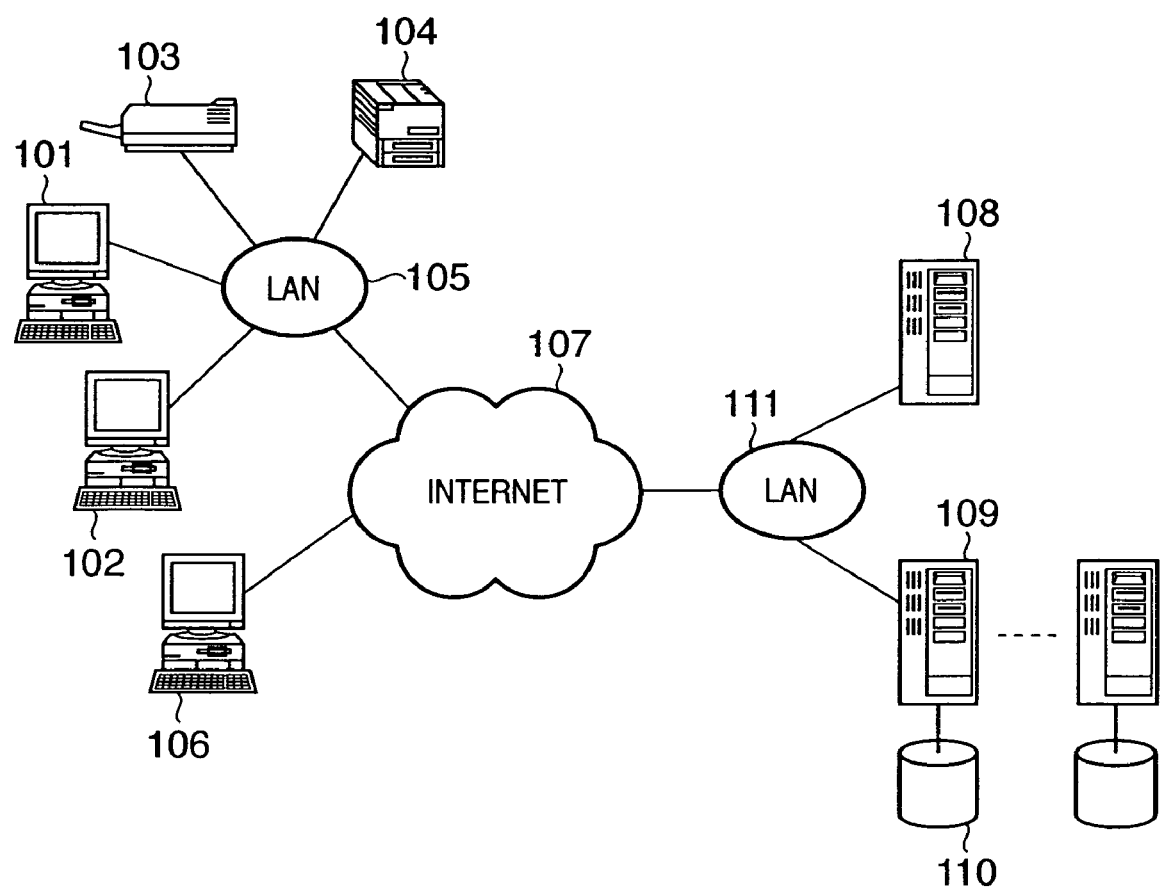
FIG. 1 is a view showing an example of the arrangement of a network system according to the embodiment.

FIG. 1 is a view showing an example of the arrangement of a network system according to the embodiment. Referring to FIG. 1, client PCs 101 and 102 are used by the system administrator to register new files or execute system maintenance by correcting user management information or by a user to input an instruction to search for merchandise or output merchandise information.

A scanner 103 is shared on the network and serves as an image input device to read image data of a catalog in accordance with an instruction from the client PC. A printer 104 is shared on the network and serves as an image output device to output merchandise information or catalog data in accordance with an instruction from the client PC.

Reference numerals 105 and 111 denote local area networks (LANs). The devices 101 to 104 connected to the network exchange data through the LAN 105. Reference numeral 107 denotes Internet; and 106, a client PC connected to the Internet 107 directly through a dedicated line or from a public line through a service provider.

The client PC 106 is used for the same purpose as that of the client PCs 101 and 102, although the connection form is different. The LAN 105 is connected to the Internet 107 through a router or gateway (not shown). Each of the client PCs 101, 102, and 106 has a predetermined browser so that the user can access an HTTP (Hyper Text Transport Protocol) server (to be described later) by operating the browser.

An HTTP server 108 receives a request by an HTTP protocol from the client PCs 101, 102, and 106 through the network such as the LAN 105 or Internet 107. Reference numeral 109 denotes a Web application server. A plurality of Web application servers 109 are registered in the HTTP server 108. The HTTP server 108 allocates processing to an appropriate Web application server 109 in accordance with request contents from the client PC. The Web application server 109 which has received the request executes the processing and returns the processing result to the client PC through the HTTP server 108. A database 110 records content information such as catalogs and image data, text information such as merchandise information, user/group information, and system information for processing of registered data files.

As described above, the HTTP server 108, Web application servers 109, and databases 110 organically combine together and function as a Web database system.

The hardware arrangement of a computer which implements the function of each of the above-described client PCs 101, 102, and 106, HTTP server 108, and Web application server 109 will be described next.

Figure 2:
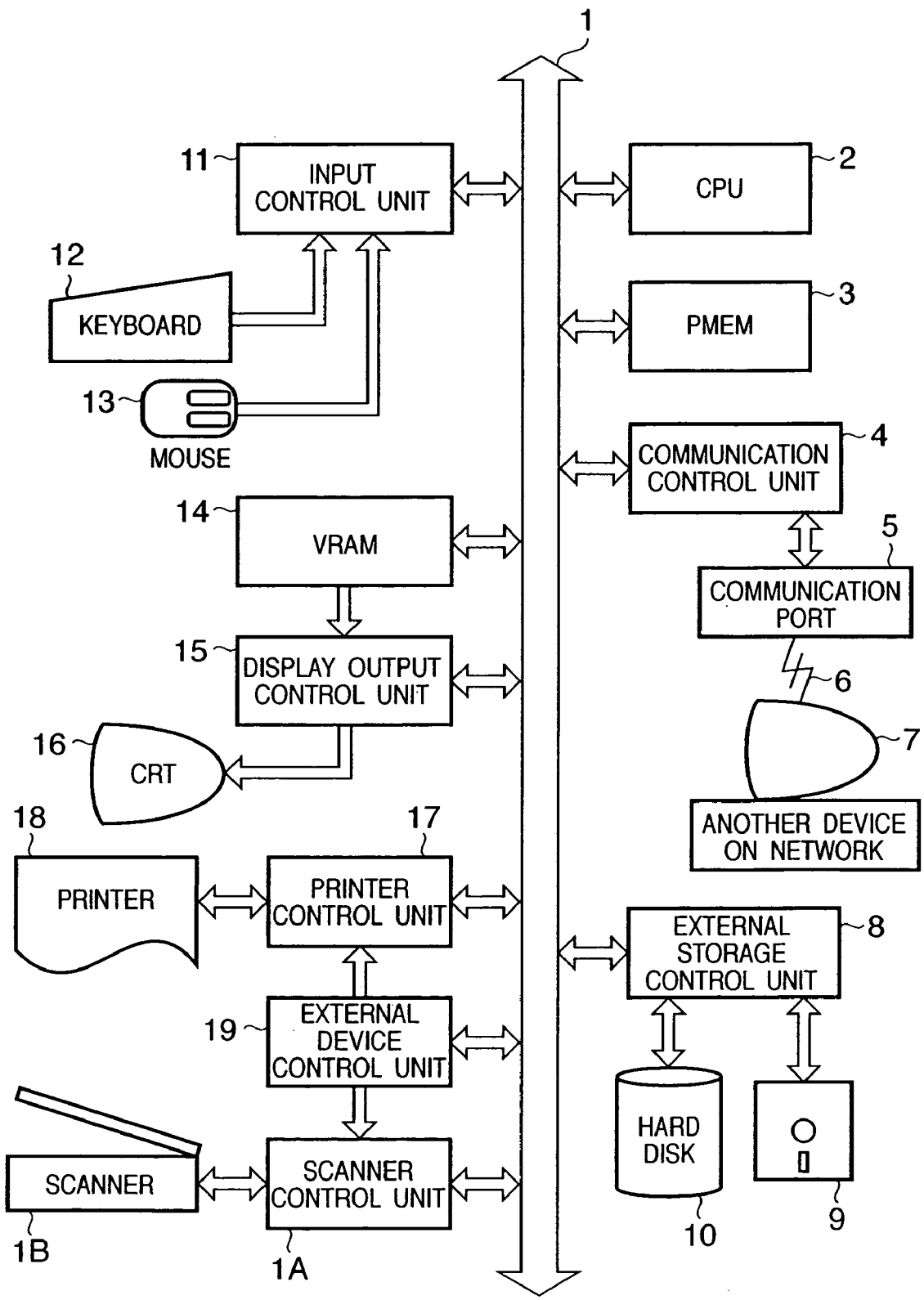
FIG. 2 is a block diagram showing an example of the arrangement of a computer according to the embodiment.

FIG. 2 is a block diagram showing an example of the arrangement of a computer according to this embodiment. Referring to FIG. 2, reference numeral 1 denotes a system bus to which the constituent blocks to be described below are connected; 2, a CPU (Central Processing Unit); and 3, a program memory (to be referred to as a PMEM). A program for processing is appropriately selected and read from a hard disk 10 in the PMEM 3 and executed by the CPU 2. Data input from a keyboard 12 is stored as code information in the PMEM which also serves as a text memory.

A communication control unit 4 controls input/output data through a communication port 5. A signal output from the communication port 5 is transmitted to the communication port of another device on the network through a communication line 6.

Data transmission/reception to/from the printer 104 and scanner 103 which are shared on the network is done through the communication control unit 4. In this embodiment, a network such as a LAN will be described. However, the present invention can also be applied even when the communication port 5 and communication line connected to the communication control unit 4 are general public lines.

Reference numeral 8 denotes an external storage device control unit; and 9 and 10, disks for data files. Reference numeral 9 denotes, e.g., a flexible disk (to be referred to as an FD); and 10, a hard disk (to be referred to as an HD). Even an optical disk such as a DVD may be used.

Reference numeral 11 denotes an input control unit to which input devices such as the keyboard 12 and mouse 13 are connected. The operator inputs an operation instruction of the system by operating the keyboard 12. Reference numeral 13 denotes a pointing device (to be referred to as a PD) to instruct manipulation of image information on a CRT 16. In this embodiment, a mouse is used. With the mouse, the cursor on the CRT 16 is arbitrarily moved in the X and Y directions to select a command icon on the command menu and input a processing instruction. In addition, an editing target and drawing position are also instructed.

Reference numeral 14 denotes a video image memory (to be referred to as a VRAM); 15 a display output control unit; and 16, a CRT. Data displayed on the CRT 16 is bitmapped on the video image memory 14 as bitmap data.

A printer control unit 17 controls output of data to a connected printer 18. A scanner control unit 1A controls a connected scanner 1B.

In this embodiment, the client PCs 101 and 102 need not always include, as constituent elements, the printer control unit 17, printer 18, scanner control unit 1A, and scanner 1B because the scanner 103 and printer 104 on the LAN 105 can be used through the communication control unit 4 and communication port 5, as described above. However, the client PC 106 may be designed including the above-described constituent elements.

The scanner 103 and printer 104 may be formed from physically separated components or a single component.

The program stored in the ROM in this embodiment may be stored in the storage medium such as the hard disk (HD) or flexible disk (FD) directly connected to the device. The program may be stored on another device connected through the network. The above-described program is supplied to a system or apparatus through a storage medium such as an FD or HD or a network.

The software arrangement of a computer which implements the function of each of the above-described client PCs

101, 102, and 106, HTTP server 108, and Web application server 109 will be described next.

Figure 3:
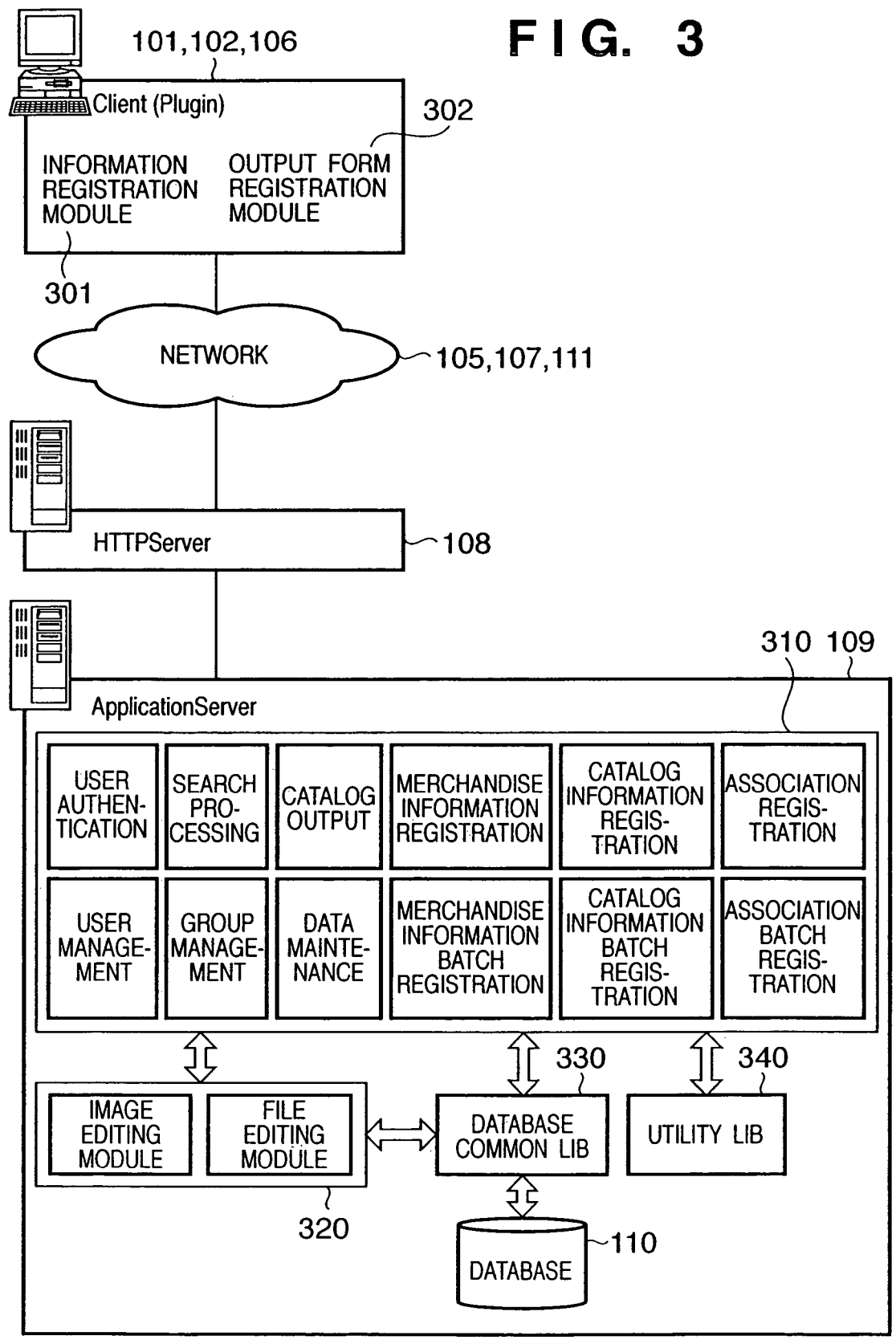
FIG. 3 is a block diagram showing an example of the module arrangement of software in the computer.

FIG. 3 is a block diagram showing an example of the module arrangement of software in the computer. As shown in FIG. 3, each of the client PCs 101, 102, and 106 stores an information registration module 301 to register a file of catalog information or image data in the Web application server 109, and an output form registration module 302 to register a merchandise data output form. The modules 301 and 302 are automatically distributed from the HTTP server 108 as needed by, e.g., the plug-in system of the Web browser and need not be installed in the client PC.

The Web application server 109 stores a module 310 to process requests from the client PCs 101, 102, and 106, which are received from the HTTP server 108. Functions corresponding to requests are user authentication, search processing, batch registration of various kinds of data, merchandise information output, and data maintenance. The module 310 is loaded on the memory in accordance with a request from the client PC and executes processing.

In addition to the above-described module 310, an image editing module to edit an image such as a PDF file or bitmap file and a file editing module to execute editing such as connection or division for a document file or text file are stored as an editing module 320. The Web application server 109 also includes a database common library 330 to transmit/receive data to/from the database 110 and a utility library 340.

Information registered in the database 110 of the Web application server 109 according to this embodiment will be described with reference to FIGS. 4 and 5.

Figure 4:
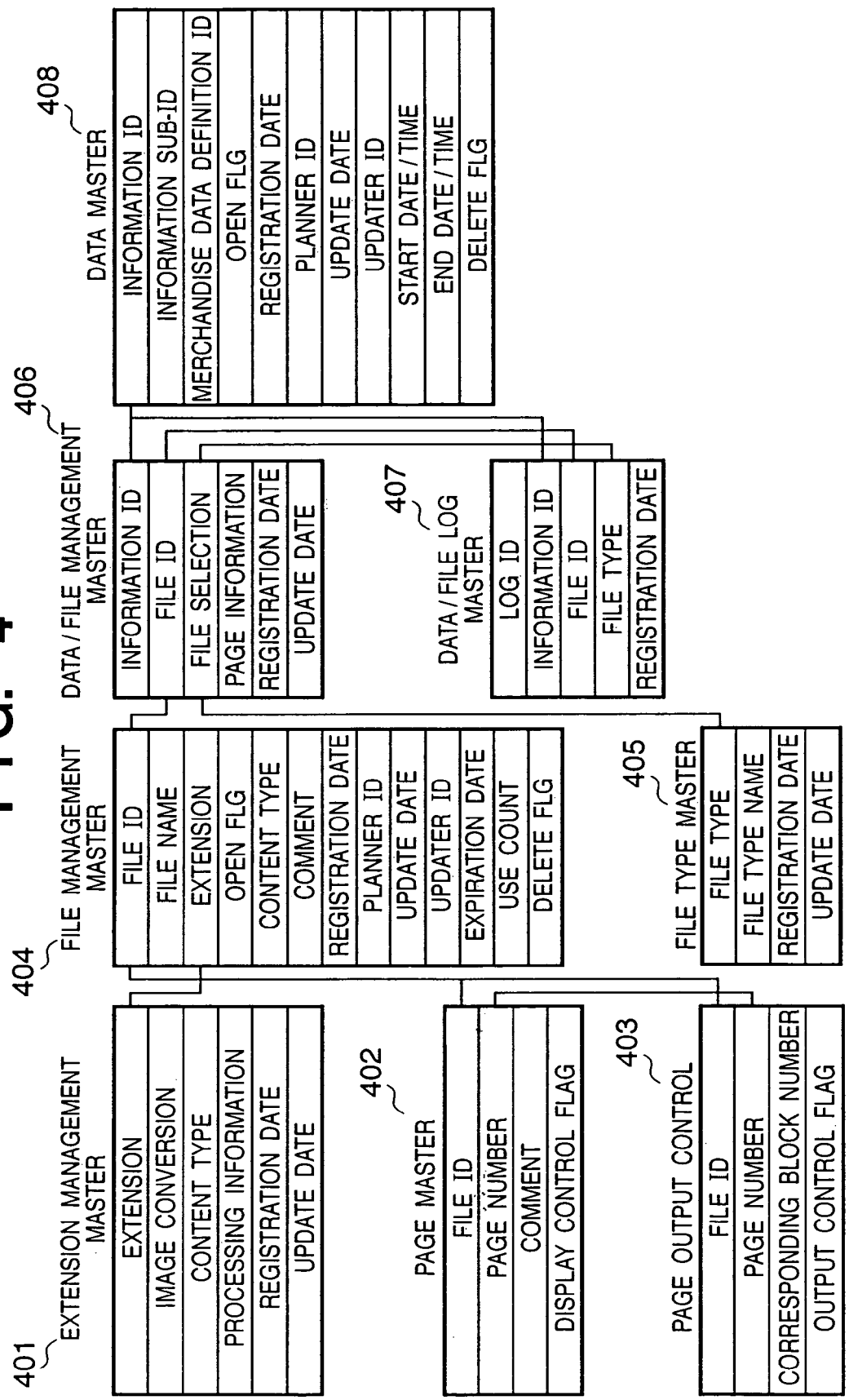
FIG. 4 is a view showing an example of a table in a database 110.

FIG. 4 is a view showing an example of a table in the database 110. A data master 408 is a table which manages text information such as merchandise information and catalog information. The pieces of information recorded in this table are a uniquely determined information ID, a registration date, an update date, start and end dates/times representing the expiration date of the information, an open flag to control whether the information is open on the Web, and a delete flag to control whether the information has been deleted.

A file management master 404 is a table which manages catalog information and image data as files. The pieces of information recorded in this table are a uniquely determined file ID, a registration date, an update date, the expiration date of the information, an open flag to control whether the information is open on the Web, and a delete flag to control whether the information has been deleted.

As the expiration date, the latest date in the associated data master is recorded. For example, when the expiration date of a file (image data) is associated with a Maui course on Jul. 31, 2004 and a Hawaii course on Aug. 31, 2004, the expiration date of the file is Aug. 31, 2004.

The file management master 404 also has a use count which indicates the number of uses of the file. The use count is 0 in the initial state. Every time the user creates an original catalog and uses the file, the use count is incremented by one. Conversely, when an original catalog is deleted, the use count is decremented by one.

For content type information or file attribute information, the file management master 404 is associated with an extension management master 401. For a multi-page file, the file management master 404 is associated with a page master 402 and page output control 403 which manage page information for each page.

The attribute information of each page is stored in the page master 402. The attribute information contains the file ID of each page, page number information, comment information, and display control flag. In the display control flag, information is set to display a representative window to display a thumbnail of associated catalog information on, e.g., a search window.

In the page output control 403, information for page output is set. The contents of the information include a file ID, page number information, corresponding block information, and output control flag. The corresponding block information is used to group other associated page information. For example, when pieces of associated information are included in second to fifth pages of one catalog file, complete information can be obtained by using all of these pages. Hence, these pages are preferably managed as a set. In this case, these pages can be grouped by setting them in the corresponding block information by using common key data.

As the output control flag, attribute information for page output is set. For example, a page containing an article in a catalog file must always be attached at the time of output. Hence, "required page" is set as attribute information. When the contents of a page in a catalog file are associated with a piece of information, "individual page" is set. When the contents are associated with a plurality of pieces of information, "common page" is set.

The extension management master 401 is a table in which content information or processing information effective for a data file with the extension is recorded. In the processing information, whether, e.g., compression processing or page division/connection processing can be executed is recorded.

The page master 402 is a table in which file information divided for each page is recorded. For a catalog file registered as a PDF file, each page information is recorded as a file divided for each page. In the display control flag, a display attribute is set.

The page output control 403 is a table which manages setting for print output. A print output attribute is set in the output control flag. Grouping information is set in the corresponding block number.

A data/file management master 406 is a table which associates file information managed by the file management master 404 with text information managed by the data master 408. Files can be associated for each page.

A file type master 405 is a table which manages file type information to execute categorization in associating file information with text information. Examples of file type information are integrated catalog data, regional catalog data, and main image data.

A data/file log master 407 is a table which manages the log of file information and text information.

Figure 5:
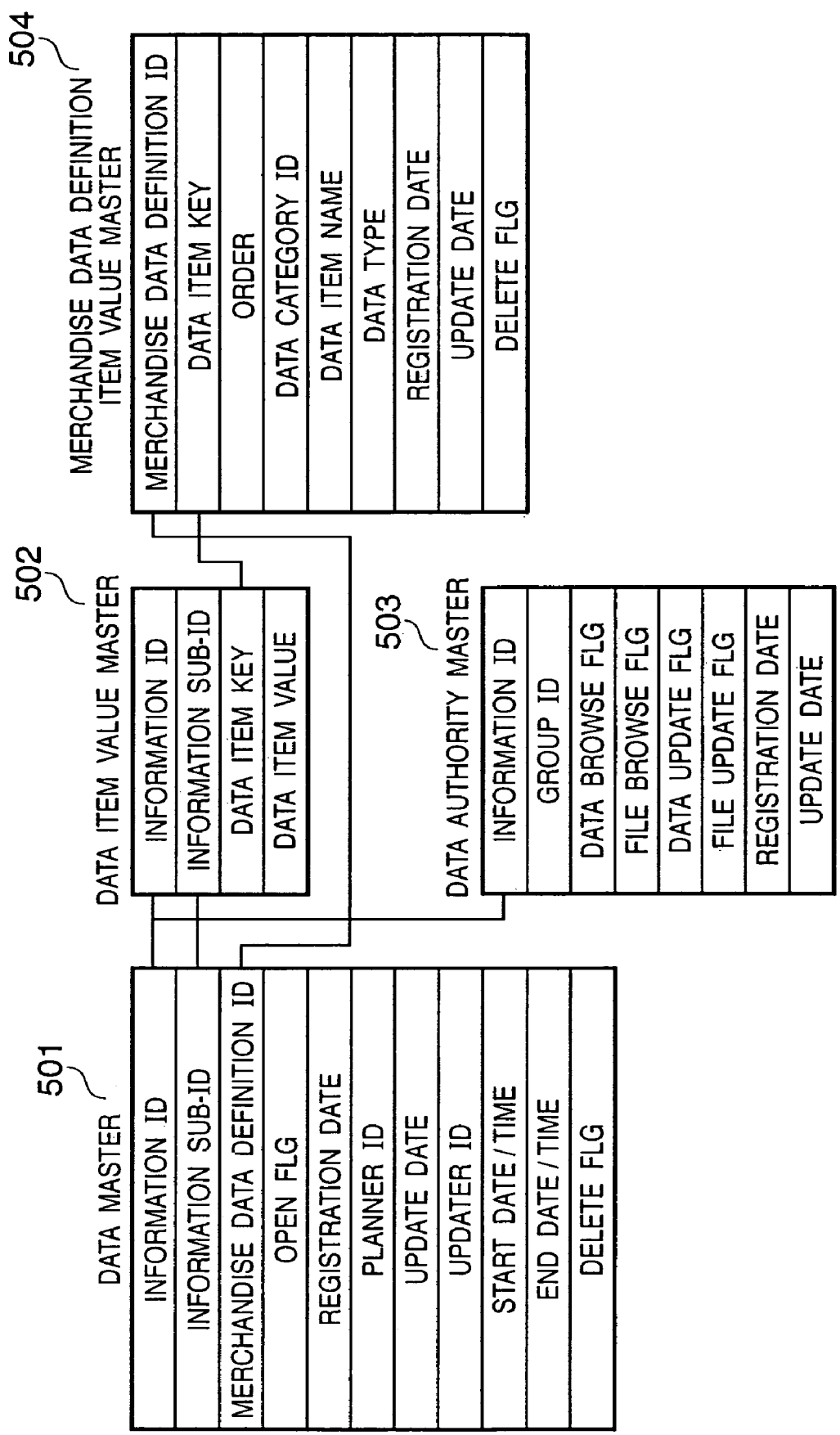
FIG. 5 is a view for explaining details of a data master 408 shown in FIG. 4.

FIG. 5 is a view for explaining details of the data master 408 shown in FIG. 4. A data master 501 is the same table as the data master 408 shown in FIG. 4. A data item master 502 is a table which manages data items associated with the data master. Examples of the items are a destination, promoter, and area. A merchandise data definition item value master 504 is a table which manages form data in displaying each item of the master data. Pieces of information such as the display order and the names of data items to be displayed are set in this table. A data authority master 503 is a table which manages authority information for the data master. The types of authority are data browse, file browse, data update, and file update. The data authority is set for each group ID.

Processing of causing the system administrator (information registrar) to register catalog information and merchandise information in the database 110 of the Web application server 109 through the HTTP server 108 from a predetermined client PC and set to open the registered information to the public will be described below.

Figure 6:
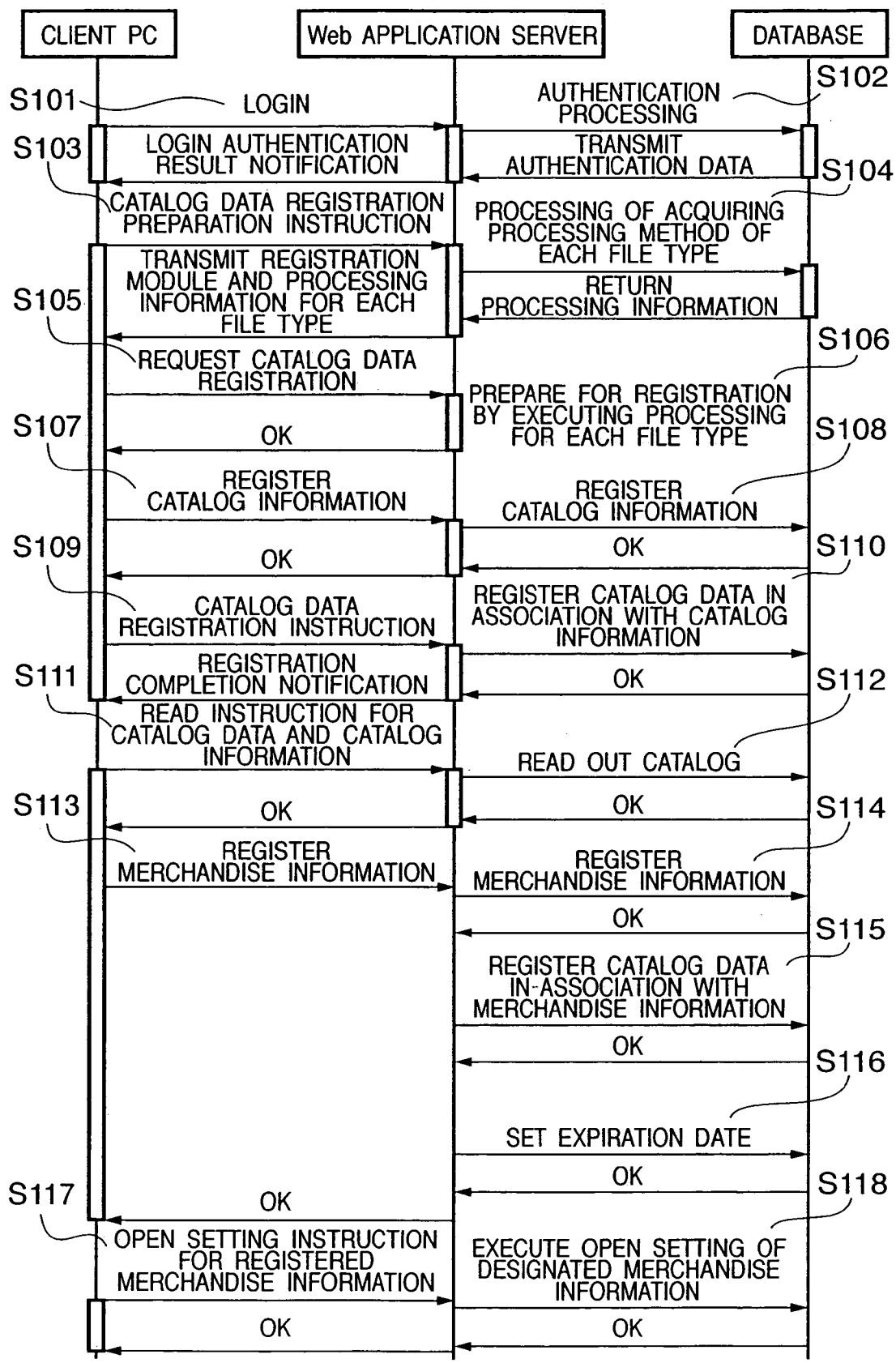
FIG. 6 is a sequence chart showing an example of the registration sequence of catalog information and merchandise information.

FIG. 6 is a sequence chart showing an example of the registration sequence of catalog information and merchandise information. In short, the HTTP server 108 is used as a proxy device in information exchange between the clients (101, 102, and 106) and the application server 109 and is not illustrated in FIG. 6.

In step S101, the system administrator executes login processing from a predetermined client PC by an account and password. Any other authentication method except an account and password can be executed without any problem. In step S102, upon receiving this request, the Web application server 109 acquires authentication data from the database 110 and executes authentication processing to determine on the basis of the input account and password whether to permit catalog data registration processing. If the input account and password are not authentic, and registration processing cannot be permitted, the Web application server 109 transmits an error window to the client PC. The browser of the client PC displays the error window on the CRT 16.

Figure 8:
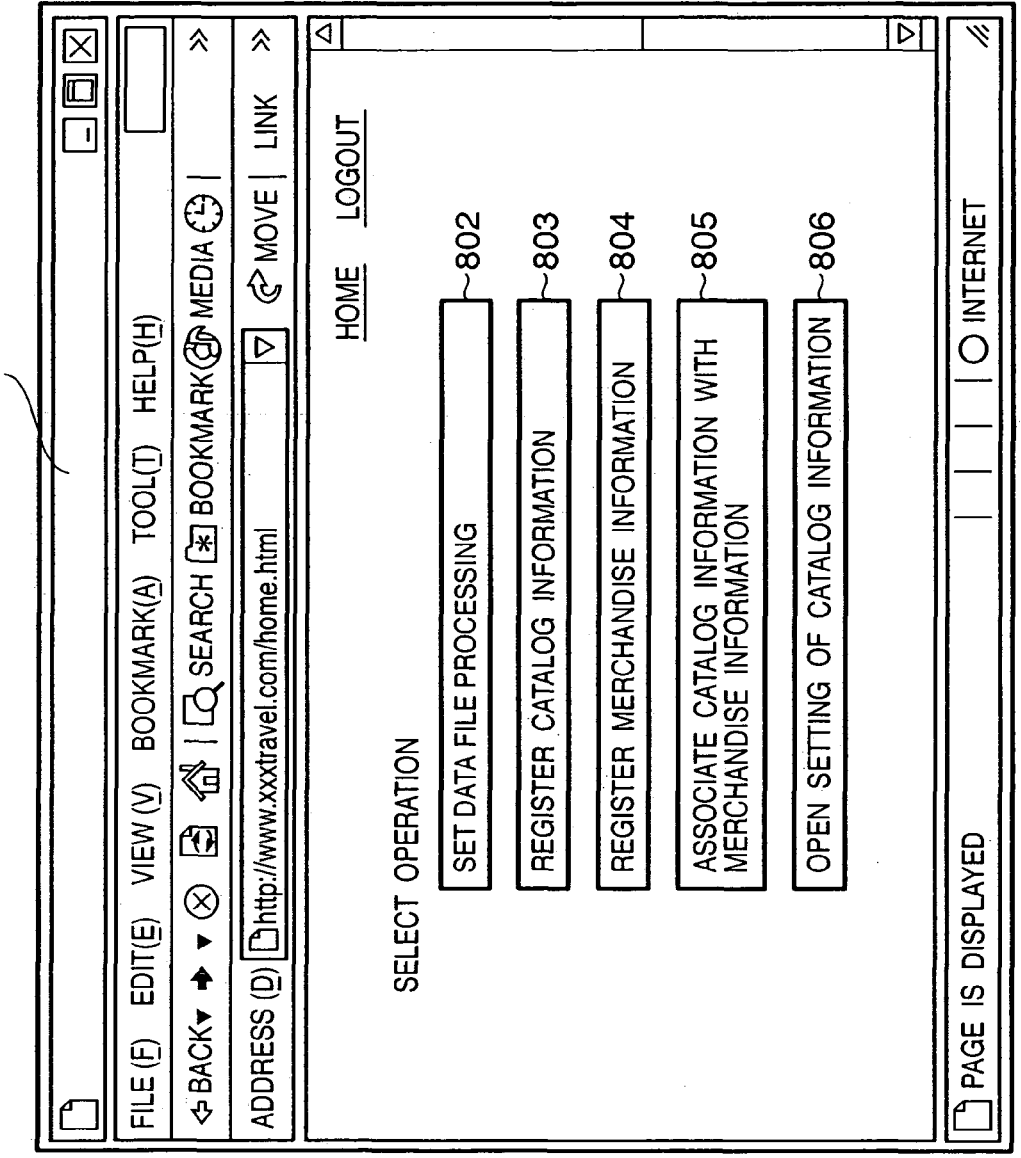
FIG. 8 is a view showing an example of a registration function list window according to the embodiment.

If execution of registration processing can be permitted as a result of authentication processing, for example, a registration window for the system administrator as shown in FIG. 8 is transmitted to the client PC. The browser of the client PC displays the registration window on the CRT 16.

FIG. 8 is a view showing an example of a registration function list window according to this embodiment. Referring to FIG. 8, a data file processing set button 802 makes it possible to set, for each file type, processing to be executed on the server side. A catalog information register button 803 causes the system administrator to select catalog data to be registered in the database 110 and execute registration processing. A merchandise information register button 804 makes it possible to register, in the database 110, information of each piece of merchandise contained in the catalog data. A catalog data/merchandise information associate button 805 associates the catalog data and merchandise information registered in the database 110. A catalog information open set button 806 makes it possible to set whether to open the catalog information registered in the database 110 to the public on the Internet.

In step S103, a catalog file registration preparation instruction is sent to the Web application server 109. In step S104, the Web application server 109 reads out processing methods for the respective file types from the database 110 and transmits them to the client PC together with the information registration module 301. If the information registration module 301 is already present on the client PC, the information registration module 301 is not transmitted.

In step S105, in accordance with the operation of the system administrator, the client PC selects catalog data to be registered and transmits a catalog data registration start instruction to the Web application server 109.

Figure 7:
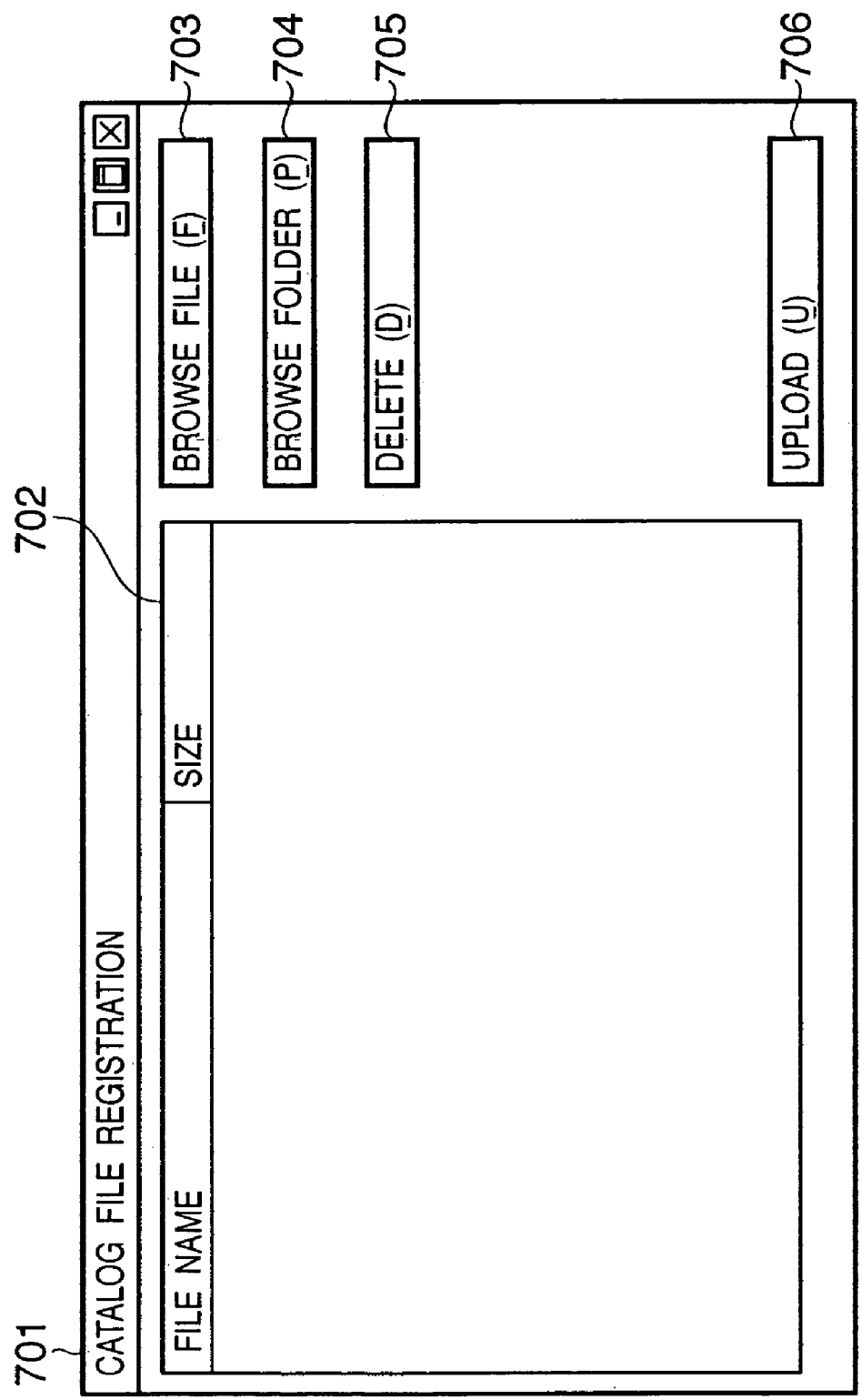
FIG. 7 is a view showing an example of a window to register a catalog file according to the embodiment.

FIG. 7 is a view showing an example of a window to register a catalog file according to this embodiment. This window is displayed by the information registration module 301 transmitted from the Web application server 109 to the browser of the client PC.

Referring to FIG. 7, reference numeral 701 denotes a catalog file registration window. In a file list region 702, a list of files to be registered in the database 110 of the Web application server 109 is displayed. A button 703 is used to display a file browse window to select files to be registered. When this button is selected, a window to browse files is displayed. When files are selected, all the selected files are displayed in the file list region 702.

When a folder browse button 704 is selected, a window to browse folders is displayed. When a folder is selected, all files contained in the selected folder are displayed in the file list region 702. A delete button 705 is used to select a file to be deleted from files displayed in the file list region 702. When this button is selected, a file selected from the list of files to be registered is deleted. An upload button 706 is used to execute processing of registering all files displayed in the file list region 702 in the database 110 of the Web application server 109. When the button 706 is selected, a registration confirmation window shown in FIG. 9 is displayed.

Figure 9:
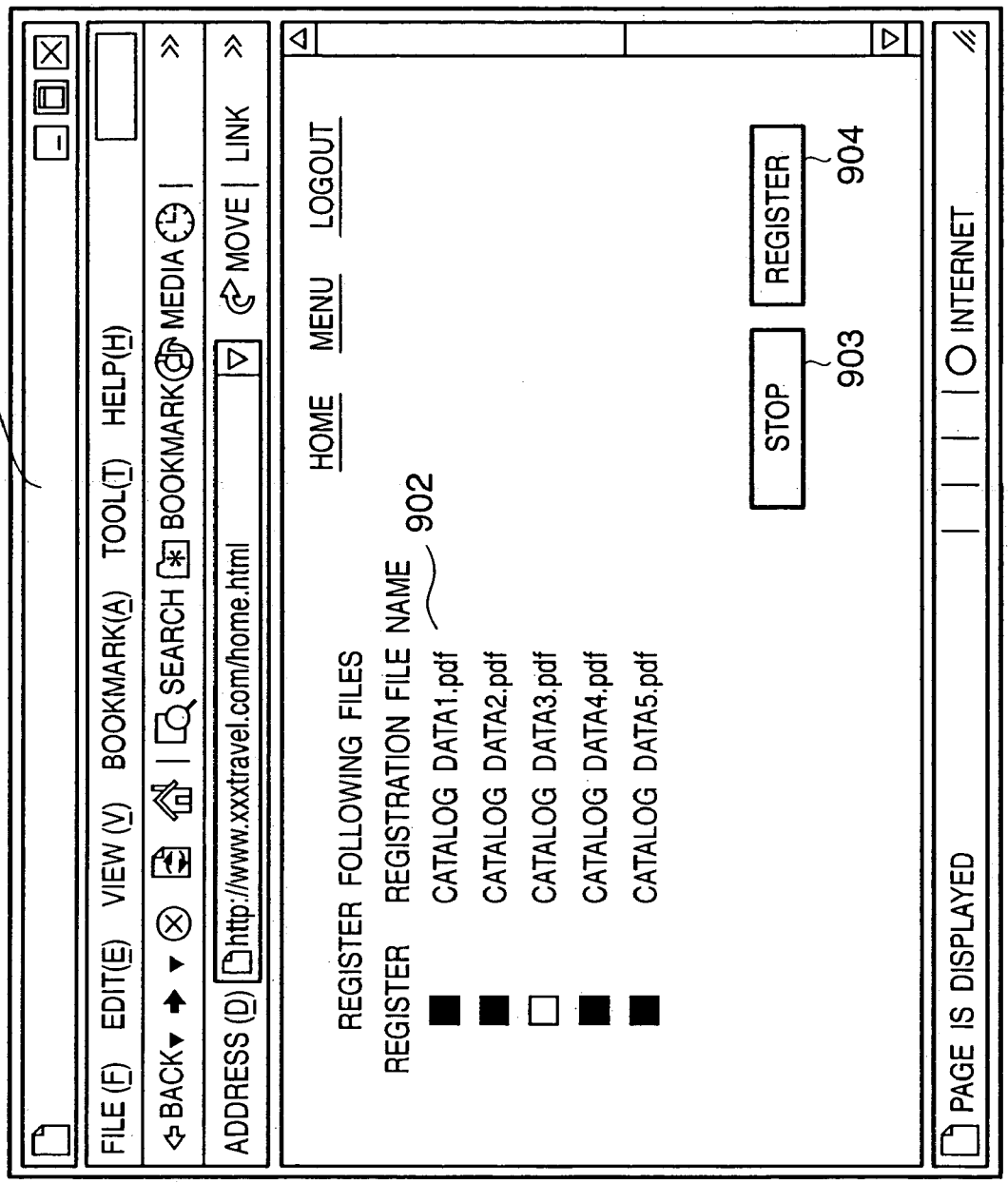
FIG. 9 is a view showing an example of a registration file confirmation window according to the embodiment.

FIG. 9 is a view showing an example of the registration file confirmation window according to this embodiment. Referring to FIG. 9, reference numeral 901 denotes a confirmation window; and 902, a list of files to be registered. In this window, files of types which are not registered in the database 110 of the Web application server 109 (files of types which cannot be processed by the Web application server) are automatically deleted from the registration file list 902. That is, such files are neither displayed in the registration file list 902 nor registered in the database.

Even a file displayed in the registration file list 902 can be excluded from the files to be registered by turning off the check box at the beginning of line of that file. In the example shown in FIG. 9, catalog data 3.pdf is not registered.

When a stop button 903 is selected, the registration processing is stopped. When a register button 904 is selected, the selected files are registered in the database 110 of the Web application server 109 in accordance with processing settings.

In step S106, the Web application server 109 which has received the registration request prepares for registration by editing the designated files in accordance with designated processing settings. In this case, the catalog file designated for registration is divided for each page, and catalog data of each page is created. A catalog data name is created by adding a 5-digit page number to the original catalog file name.

However, the file name rule is not limited to the 5-digit page number. In addition, a thumbnail image is generated for each of the catalog data and created files.

Figure 10:
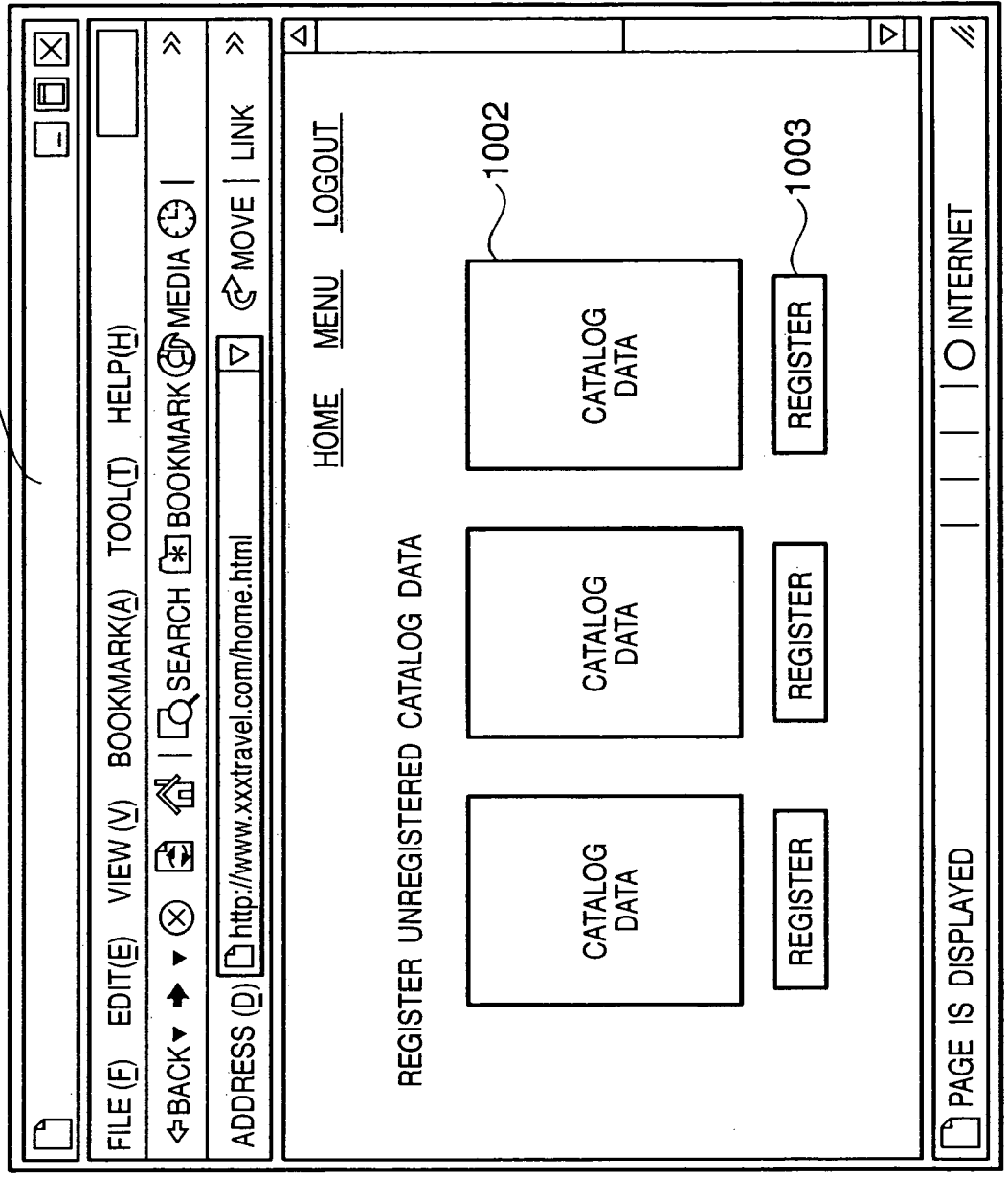
FIG. 10 is a view showing an example of a window to register unregistered catalog data.

When the registration preparation for the database 110 is normally ended, the Web application server 109 transmits, to the client PC, a window to register unregistered catalog data, as shown in FIG. 10.

FIG. 10 is a view showing an example of the window to register unregistered catalog data. Reference numeral 1001 denotes a list window of catalog data transmitted to the Web application server 109. These catalog data are still unregistered. A list 1002 of catalog data transmitted to the Web application server 109 indicates files which are not registered in the database 110 yet as usable catalog data.

When a register window 1003 is selected, registration processing of the selected catalog data in the database 110 is executed. In addition, association processing to catalog information is also executed. Even when the catalog data 1002 is selected, catalog information to be associated with the catalog data can be set.

In step S107, catalog information to be associated with the catalog data is set. First, the Web application server 109 receives the request from the client PC and registers catalog information in the database 110 of the Web application server 109 in step S108.

Figure 11:
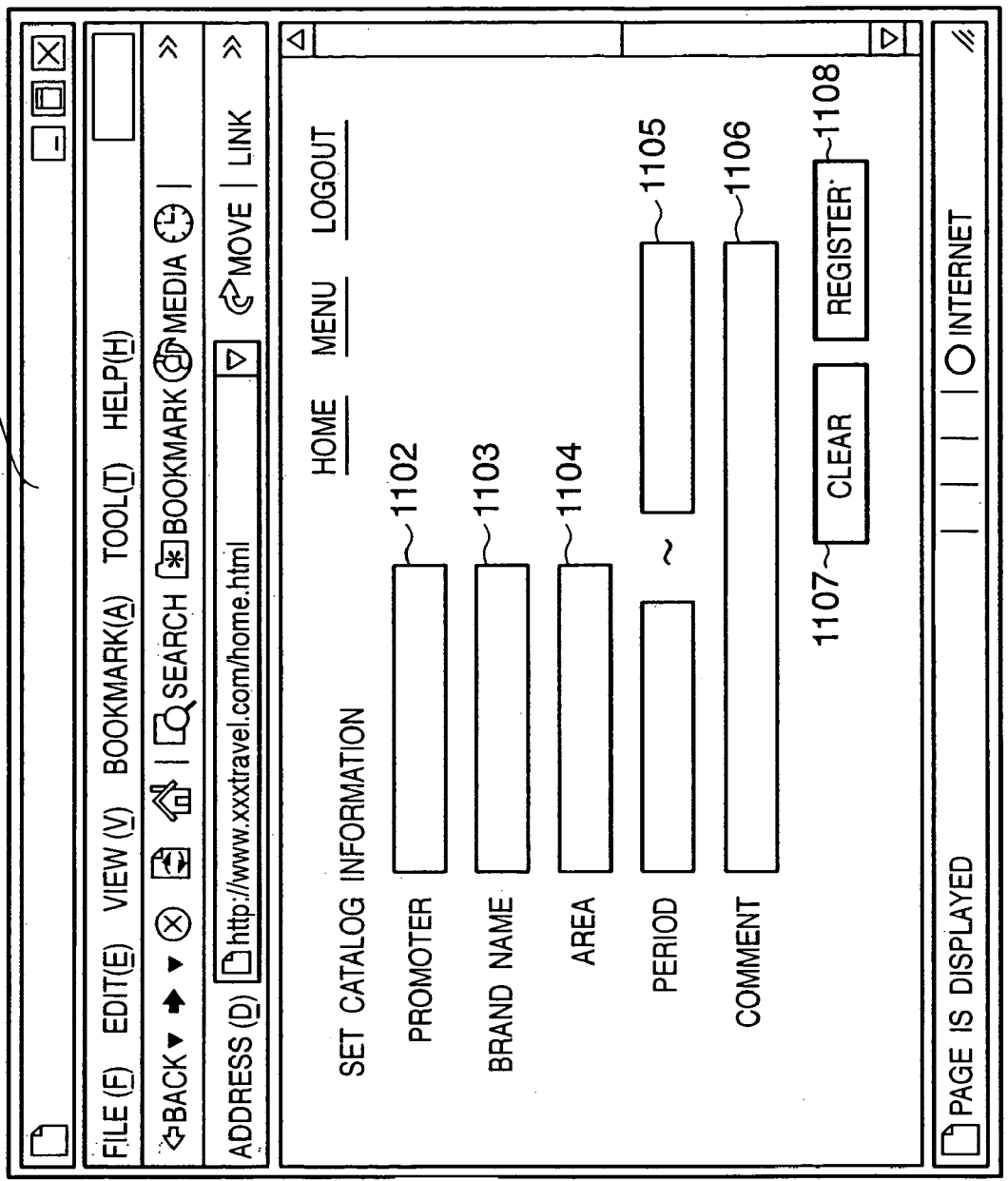
FIG. 11 is a view showing an example of a window to register catalog information.

FIG. 11 is a view showing an example of a window to register catalog information. Referring to FIG. 11, reference numeral 1101 denotes a window to set catalog information; and 1102 to 1106, setting items registered in the database 110. This window indicates an example of a tour catalog containing the tour promoter name 1102, the tour brand name 1103, the area information 1104 of the tour destination contained in the catalog, the expiration date 1105 of the catalog, and other comment information 1106. When a clear button 1107 is selected, all pieces of input information are cleared. When a register button 1108 is selected, the input catalog information is registered in the database 110 of the Web application server 109.

In step S109, a catalog data registration instruction is sent to the Web application server 109. Upon receiving the instruction, in step S110, the Web application server 109 executes catalog data registration processing in the database 110 of the Web application server 109. At this time, for example, a file which has been divided into pages in step S106 is associated with catalog data divided for each page and registered in the database 110 together with the original file. Corresponding thumbnail image files are also registered in the database 110. Association processing to catalog information is also executed.

With the above processing, registration of catalog data and catalog information in the database 110 is ended. Subsequently, registration of merchandise information contained in the catalog data and association processing to the catalog data are executed.

In step S111, a read request for the catalog data and catalog information which are registered in the database 110 is transmitted. Upon receiving this request, in step S112, the Web application server 109 reads out the catalog data and catalog information from the database 110 and returns them to the client PC. The client PC executes processing of associating merchandise information with the catalog data.

Figure 12:
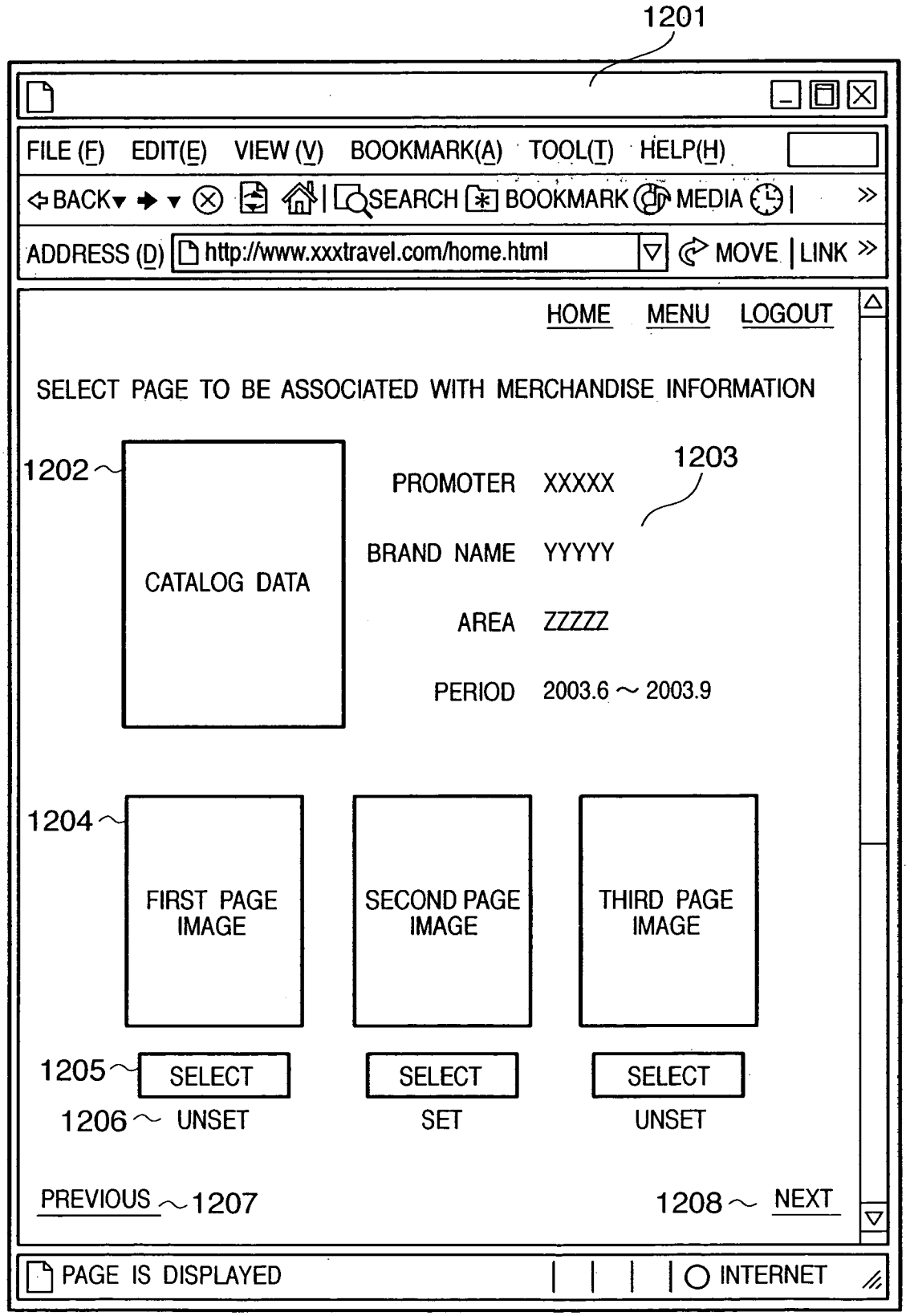
FIG. 12 is a view showing an example of a catalog information & page list display window for catalog data.

FIG. 12 is a view showing an example of a catalog information & page list display window for catalog data. Referring to FIG. 12, reference numeral 1201 denotes a catalog data information display window; 1202, a region where the image data of catalog file data is displayed. In this region, for example, cover image data is displayed. Reference numeral 1203 denotes a list of catalog information associated with the catalog file data; and 1204, a region where the thumbnail image of each page of the catalog file data is displayed.

In this example, three pages are displayed. For the remaining pages, the display can be switched by selecting a previous page button 1207 or next page button 1208. When the thumbnail image 1204 of a page is selected, a window having the original size can be displayed.

When a select button 1205 is selected, merchandise information about the corresponding page can be set. An indicator 1206 represents whether merchandise information is set for each page. In this case, "unset" is displayed for a page without merchandise information, and "set" is displayed for a page with already set merchandise information.

In step S113, the system administrator sends a request of processing of registering the merchandise information set for each page to the Web application server 109. Upon receiving this request, in step S114, the Web application server 109 registers the merchandise information in the database 110 of the Web application server 109. When this processing is normally ended, the flow advances to step S115 to execute processing of associating catalog data with the merchandise information of each page. When the association is normally ended, the flow advances to step S116 to set the expiration date of the merchandise information to the expiration date information of the catalog data. In this case, the end date/time of the merchandise information is set as the expiration date information of the catalog data. If a date/time is already set as the expiration date of the catalog data, a date later than the date/time is set as the expiration date.

Figure 13:
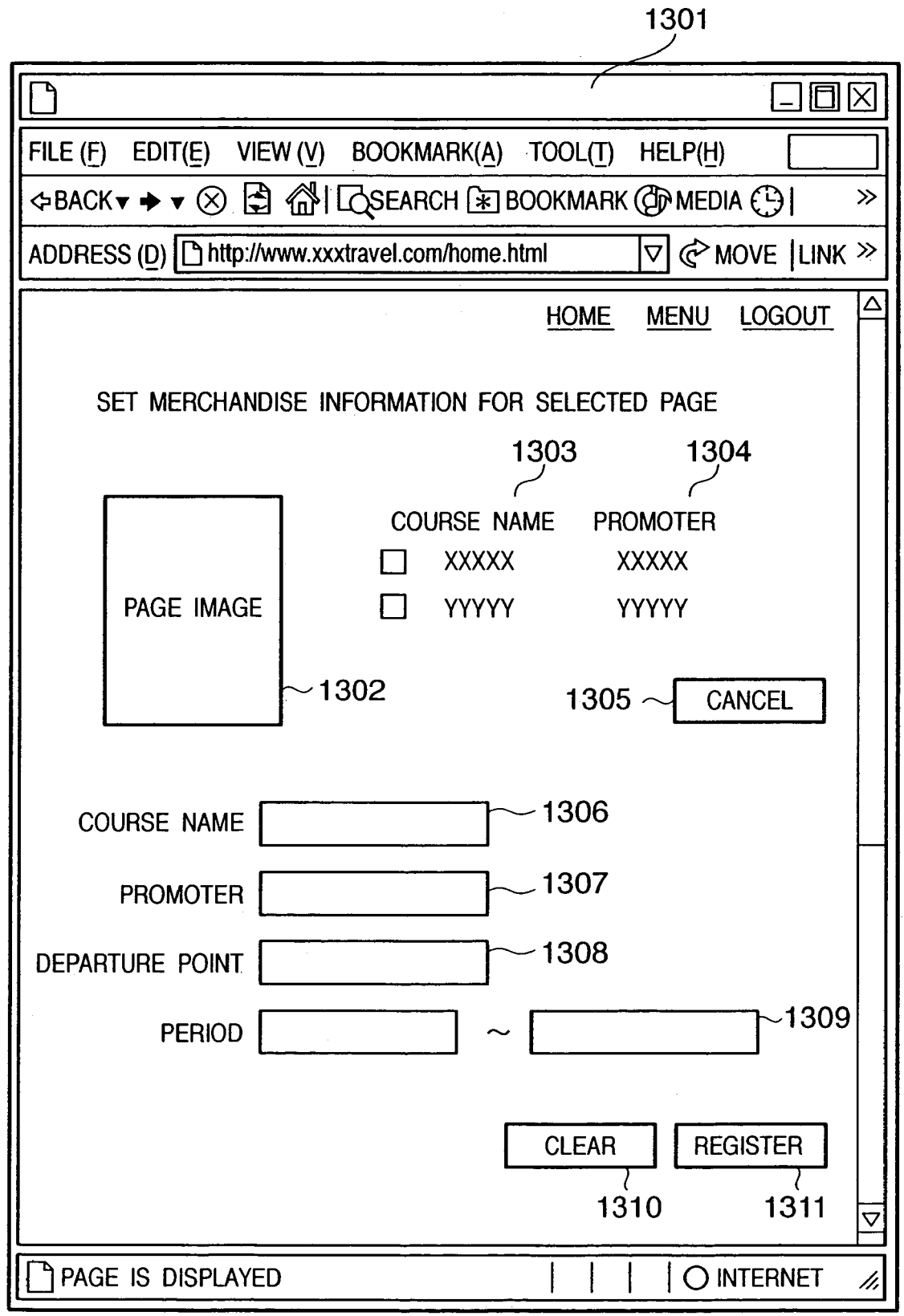
FIG. 13 is a view showing an example of a window to set merchandise information for catalog data of each page.

FIG. 13 is a view showing an example of a window to set merchandise information for catalog data of each page. Referring to FIG. 13, reference numeral 1301 denotes a window to set page information; 1302, a thumbnail image of a page selected in FIG. 12 described above; and 1303 and 1304, merchandise information already associated with the page. FIG. 13 shows an example of a tour catalog containing the course name 1303 and the promoter name 1304. The present invention is not limited to the course name and promoter name. Any other information capable of specifying the merchandise information can be displayed.

Reference numeral 1305 denotes a cancel button. When the check box at the beginning of line of associated merchandise information is turned on to select this button, the associated merchandise information can be canceled. Reference numerals 1306 to 1309 denote item setting boxes to set new merchandise information for the selected page, which include the tour course name 1306, the name 1307 of the promoter of the tour, the departure point 1308, and the period 1309 of tour. When a clear button 1310 is selected, all pieces of input information are cleared. When a register button 1311 is selected, the input merchandise information is registered in the database 110. In addition, the information associated with the page is also registered in the database 110.

Next, the processing in steps S113 to S116 is repeatedly executed. When setting of merchandise information is ended, the flow advances to step S117. In the processing until step S116, the catalog data, catalog information, and merchandise information are only registered in the database 110. In step S117, processing of opening these pieces of information registered in the database 110 to the public on the Internet is executed. When the client PC sends an open request to the Web application server 109, the Web application server 109 which has received request executes open setting of catalog data designated in step S118 for the database 110 of the Web application server 109.

Figure 14:
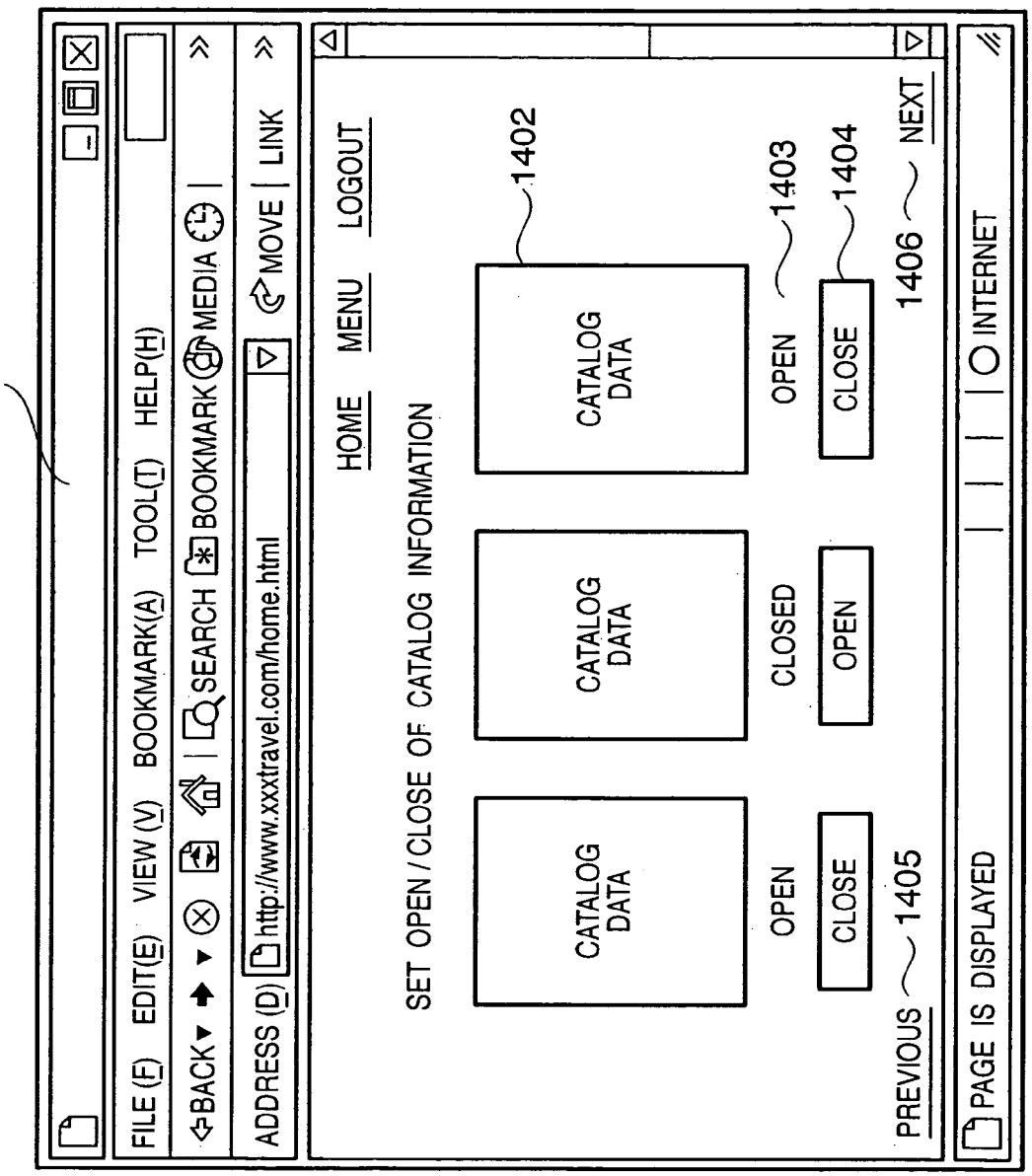
FIG. 14 is a view showing an example of an open setting window of merchandise information on the network.

FIG. 14 is a view showing an example of an open setting window of merchandise information on the network. Referring to FIG. 14, reference numeral 1401 denotes an open setting window; and 1402, a list of merchandise information registered in the database 110. In this example, catalog data about three pieces of merchandise information are displayed. For the remaining pieces of registered merchandise information, the display can be switched by selecting a previous page button 1405 or next page button 1406.

An indicator 1403 represents the open state of each merchandise information. "Open" is displayed for merchandise information which is open to the public, and "closed" is displayed for merchandise information which is not open to the public. When an open/close button 1404 is selected, selected merchandise information can be made open or closed. In accordance with the open state, the name of the button is switched between "open" and "closed".

Processing of causing a user to log in from the client PC to the Web application server 109, search for catalog data of merchandise information registered in the database 110 of the Web application server 109, and input an output instruction will be described next.

Figure 16:
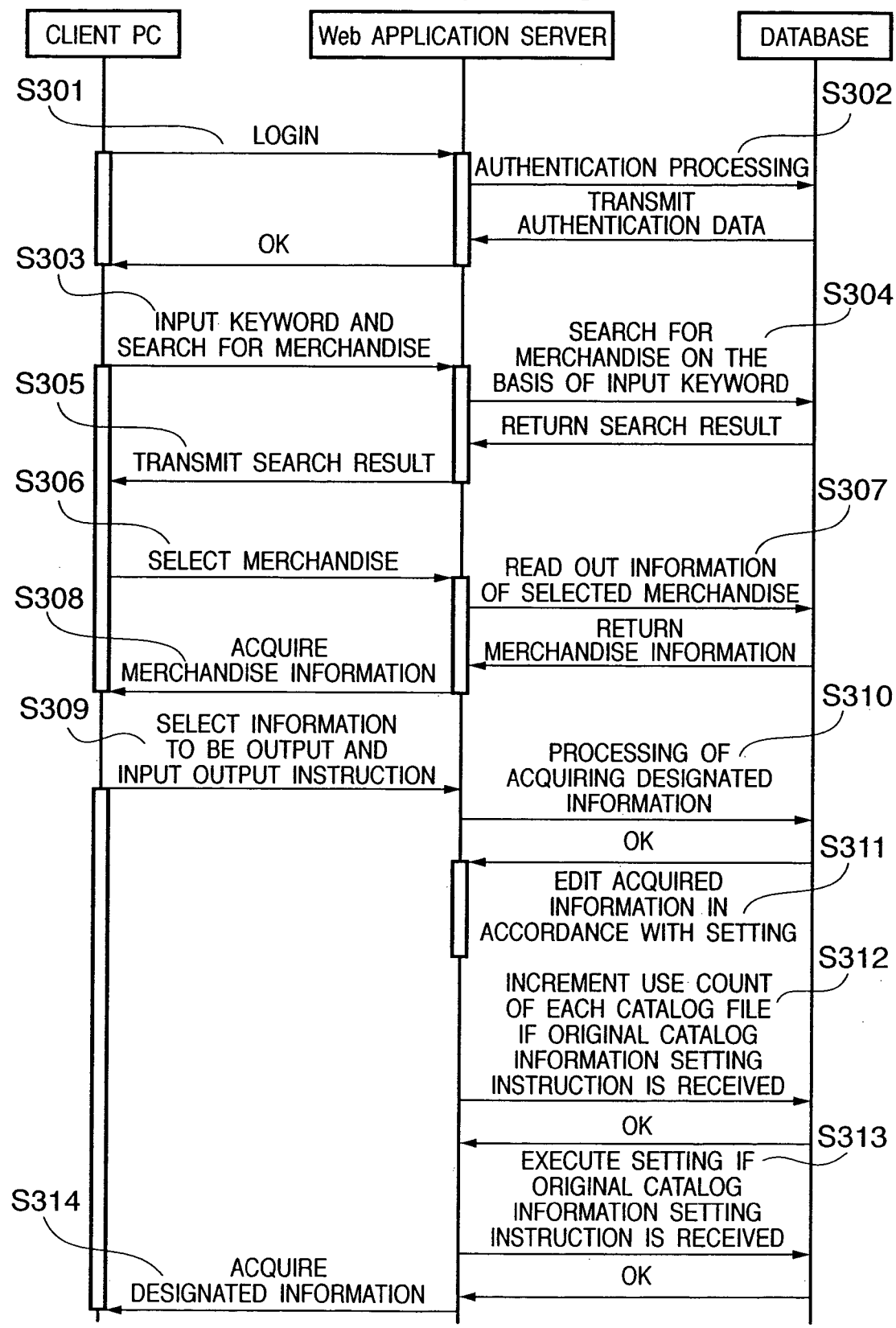
FIG. 16 is a sequence chart showing an example of a sequence of searching for catalog data about merchandise information and inputting an output instruction.

FIG. 16 is a sequence chart showing an example of a sequence of searching for catalog data about merchandise information and inputting an output instruction. In step S301, the user executes login processing from the client PC by an account and password. Any other authentication method except an account and password can be executed without any problem. In step S302, upon receiving this request, the Web application server 109 inquires of the database 110, acquires authentication data, and executes authentication processing to determine on the basis of the input account and password whether to permit the user to use the system. If use is not permitted, the Web application server 109 transmits an error window to the client PC.

If use is permitted as a result of authentication processing, a window to input a keyword is transmitted to the client PC. In step S303, the user inputs a keyword to request search of merchandise information. Upon receiving this request, the Web application server 109 searches for pieces of merchandise information corresponding to the keyword and acquires them from the database 110 in step S304. In step S305, the Web application server 109 transmits the result to the client PC as a merchandise information data list.

Figure 18:
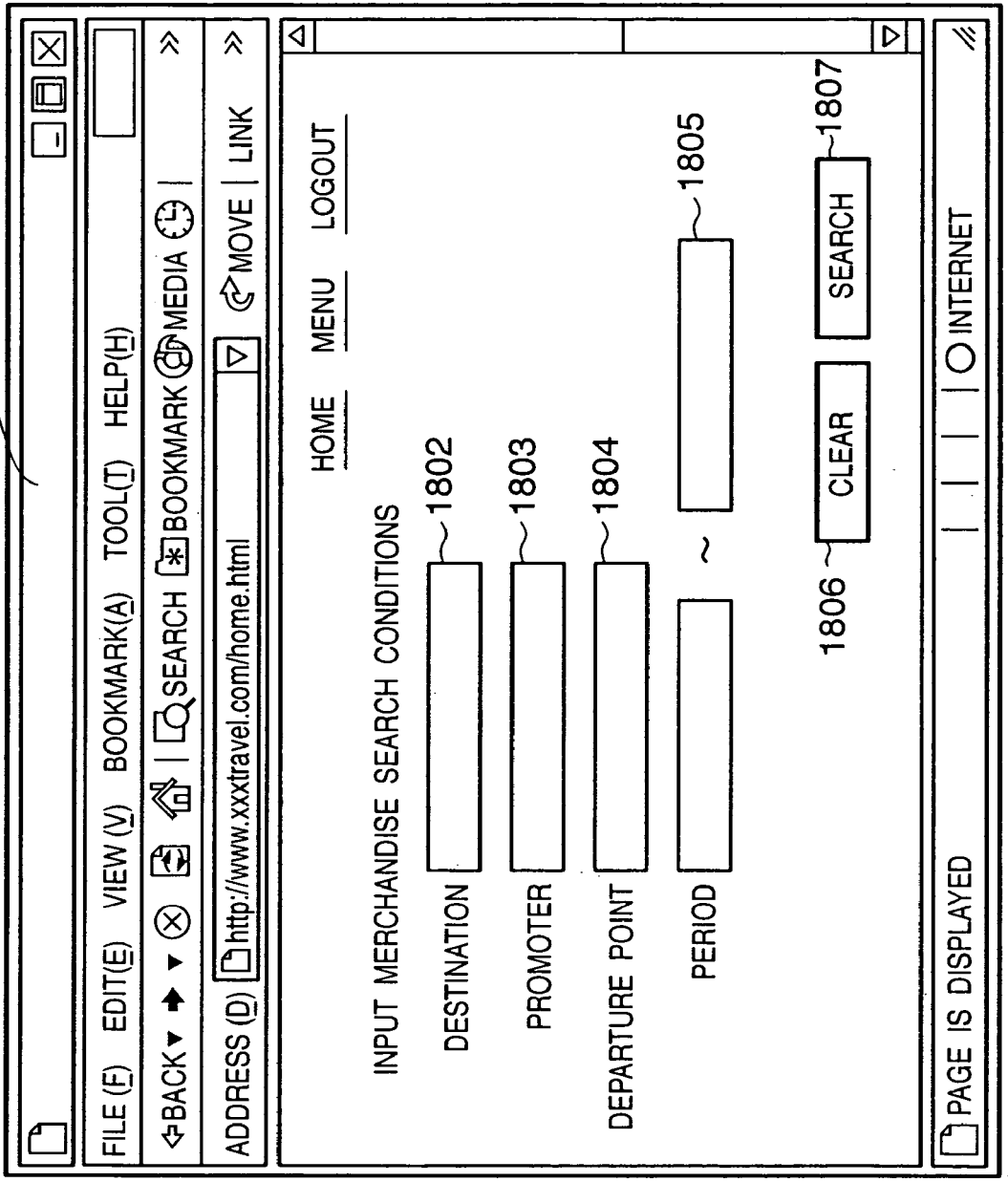
FIG. 18 is a view showing an example of a merchandise search window.

FIG. 18 is a view showing an example of the merchandise search window. Referring to FIG. 18, reference numeral 1801 denotes a search window; and 1802 to 1805, search items. FIG. 18 shows a merchandise search example of a tour catalog. The search items are not limited to those shown in FIG. 13, and any other search items managed in the database 110 can be displayed.

The search items include the tour destination 1802, tour promoter 1803, departure point 1804, and tour period 1805. At least one of these search items can be set to execute search. When a clear button 1806 is selected, all pieces of input information are cleared. When a search button 1807 is selected, search is executed.

Figure 19:
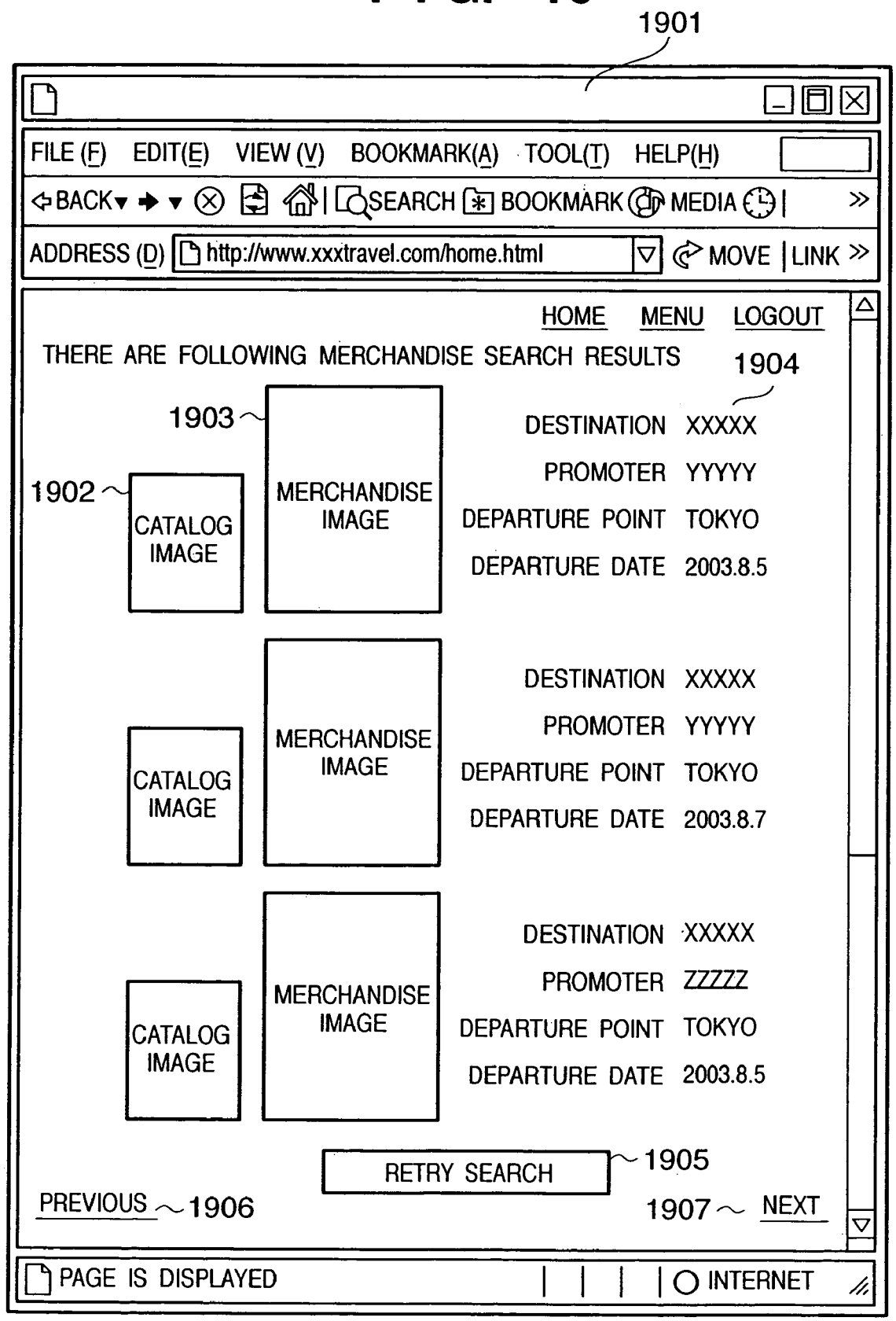
FIG. 19 is a view showing an example of a merchandise search result window.

FIG. 19 is a view showing an example of a merchandise search result window. Referring to FIG. 19, reference numeral 1901 denotes a merchandise search result window; 1902, thumbnail display of catalogs containing the found merchandise information; 1903, thumbnail display of merchandise; and 1904, simple information of merchandise. For thumbnail display, for example, the page which is set first in page information associated with each merchandise information is displayed.

When a search retry button 1905 is selected, the display returned to the search window so that the user can retry search. In this example, three pieces of merchandise information are displayed. For the remaining search results, the display can be switched by selecting a previous page button 1906 or next page button 1907. When the thumbnail image of each merchandise is selected, detailed information of the merchandise and other pieces of associated page information can be displayed.

In step S306, the client PC transmits a request of desired merchandise information selected from the search result in accordance with designation by the user. Upon receiving the request, in step S307, the Web application server 109 reads out information associated with the designated merchandise from the database 110 and returns it to the client PC. In step S308, the client PC can acquire the detailed information of the merchandise.

In step S309, the client PC transmits a request about merchandise information for which an output instruction is input by the user. In this request, the output file format is also designated. Upon receiving this request, in step S310, the Web application server 109 reads out one or a plurality of pieces of designated merchandise information from the database 110. The information read out from the database 110 is edited in accordance with the designated page setting and output file type to create a file. For example, when the designated output file type is PDF, catalog data of the respective page are acquired, connected into a file, and output.

When original catalog setting is designated, the flow advances to step S312 to increment the use count information in the file management master 404 corresponding to each page by one. When this processing is normally ended, the flow advances to step S313 to save the designated original catalog name and comment information as original catalog information. When all the processing operations are normally ended, the file is transmitted to the client PC. In step S314, the user can acquire the designated merchandise information file.

Figure 15:
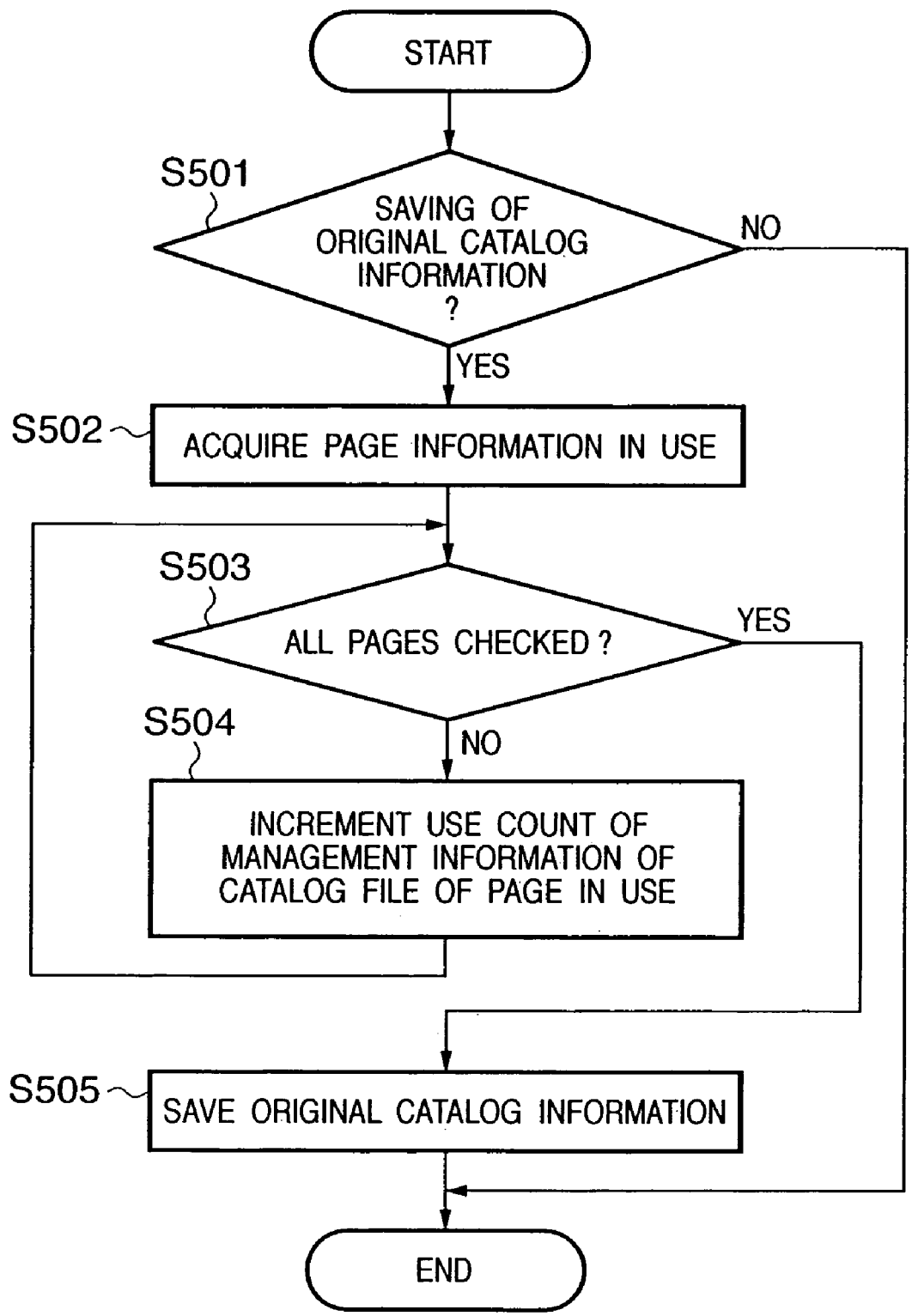
FIG. 15 is a flowchart showing original catalog information registration processing.

FIG. 15 is a flowchart showing original catalog information registration processing. In step S501, the Web application server 109 determines whether an instruction to register designated original catalog information in the database 110 is received. If NO in step S501, the processing is ended. If YES in step S501, the flow advances to step S502 to acquire page information in use. In step S503, it is determined whether all pages are checked. If NO in step S503, the flow advances to step S504 to increment the use count in the file management master corresponding to the page in use by one. The flow returns to step S503 to repeat the above-described processing.

The above-described processing in steps S503 and S504 is repeated. When all processing operations are ended, the flow advances to step S505 to register the designated original catalog information. Then, the processing is ended.

Figure 20:
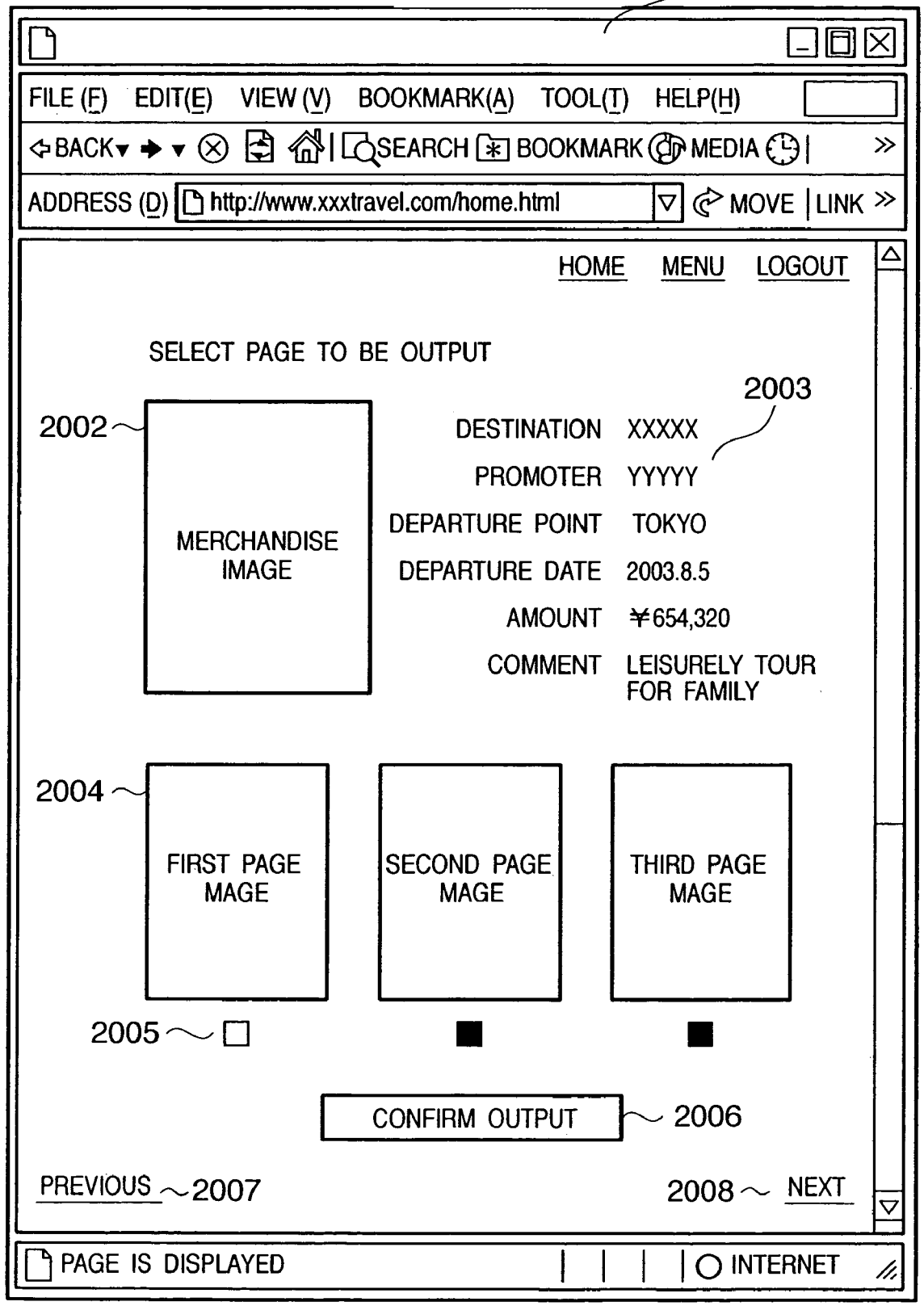
FIG. 20 is a view showing an example of a window to display merchandise information acquired in step S308 and associated pages.

FIG. 20 is a view showing an example of a window to display merchandise information acquired in step S308 and associated pages. Referring to FIG. 20, reference numeral 2001 denotes a merchandise information window; 2002, a thumbnail image of selected merchandise information. As the thumbnail image, normally, the representative image of the merchandise is displayed. Reference numeral denotes detailed merchandise information. In this example, tour course information is displayed. Reference numeral 2004 denotes associated page information of catalog data associated with the merchandise information. Thumbnail images of page information are displayed.

Each page information is not always recorded in one catalog data. In some cases, pieces of page information recorded in different catalog file data are associated with a piece of merchandise information. In this example, three associated pages are displayed. For the remaining associated pages, the display can be switched by selecting a previous page button 2007 or next page button 2008. When the thumbnail image of a page is selected, the actual image data of that page can be displayed.

Reference numeral 2005 denotes a selection check box for output of a page associated with merchandise information. To output a page, it can be selected by turning on the check box. When an output confirmation button 2006 is selected, a window (FIG. 21) to display a list of selected pages and input an output instruction can be displayed.

Figure 21:
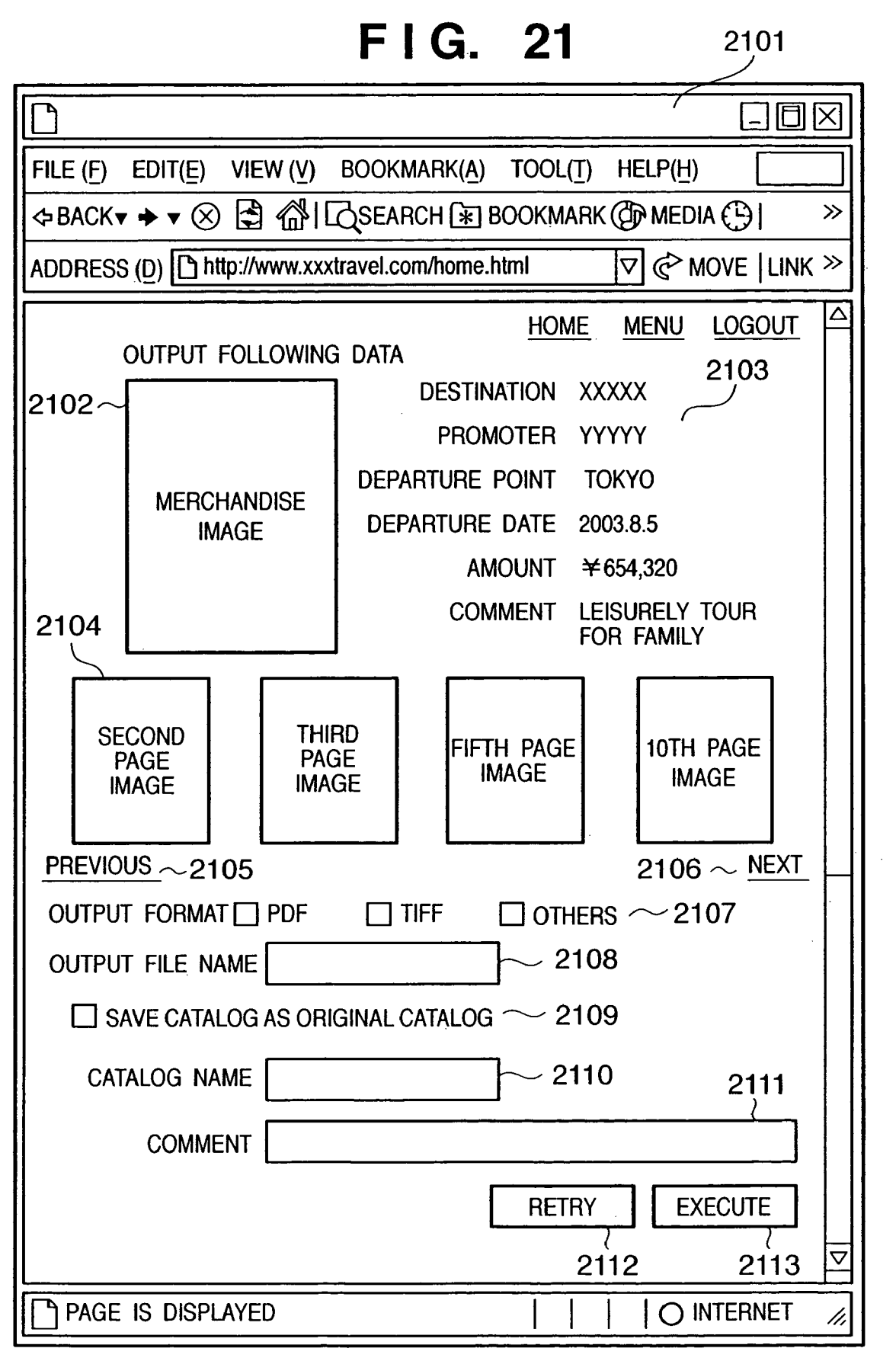

FIG. 21 is a view showing an example of a window 2101 to input a file output instruction for selected merchandise information. Reference numeral 2102 denotes a thumbnail image of selected merchandise information; 2103, detailed merchandise information; and 2104, page information selected to output. Each page information is displayed as a thumbnail image. This example indicates that second, third, fifth, and 10th pages of associated pages are selected to output. The four selected pages are displayed. When five or more pages are selected, for the remaining selected pages, the display can be switched by selecting a previous page button 2105 or next page button 2106.

Reference numeral 2107 denotes an output file format. Examples of the output file format are PDF and TIFF files. Any other file format can also be set. In an output file name box 2108, the name of the file to be output is input. A check box 2109 is used to select whether to save the page information of the selected catalog in the database 110 as original catalog information. When the check box is ON, a catalog name 2110 and comment 2111 are validated so that the user can set arbitrary information. When a retry button 2112 is selected, the previous window can be displayed. When an output execute button 2113 is selected, the output instruction in step S309 is executed in accordance with the setting.

Figure 22:
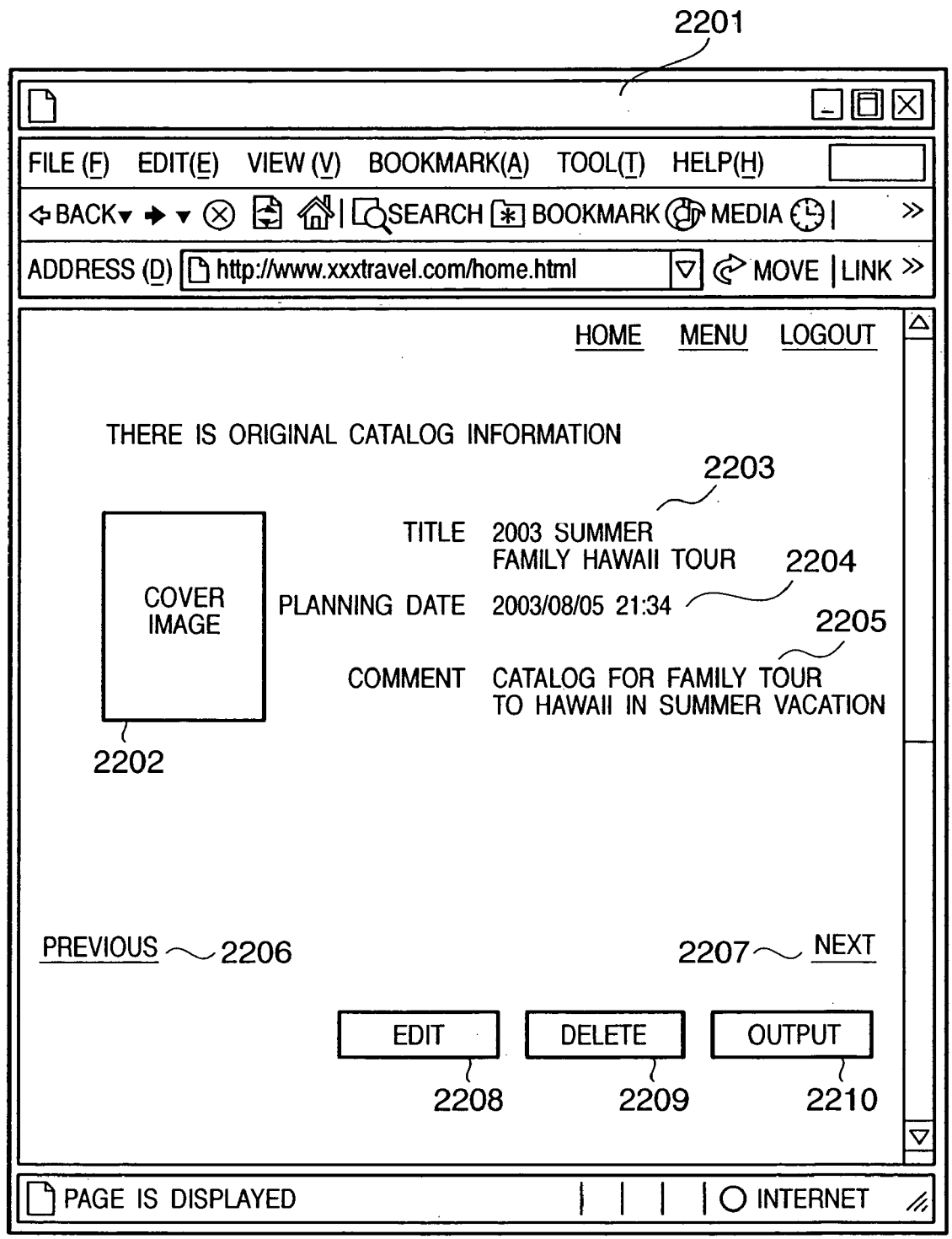
FIG. 22 is a view showing an example of a window 2201 to display a list of original catalog information set in step S313.

FIG. 22 is a view showing an example of a window 2201 to display a list of original catalog information set in step S313. Reference numeral 2202 denotes thumbnail display of registered original catalog information. For example, the thumbnail image of the first registered page (cover) is displayed. Reference numerals 2203 to 2205 denote detailed information of the original catalog, including the title, planning date/time, and comment information. In this example, only a piece of original catalog information is registered. If a plurality of pieces of original catalog information are registered, and all of them cannot be displayed in one window, the display can be switched by selecting a previous page button 2206 or next page button 2207.

When an edit button 2208 is selected, the original catalog information can be edited. When a delete button 2209 is selected, the original catalog information can be deleted from the database 110. When an output button 2210 is selected, the same catalog data file can be acquired again.

Figure 17:
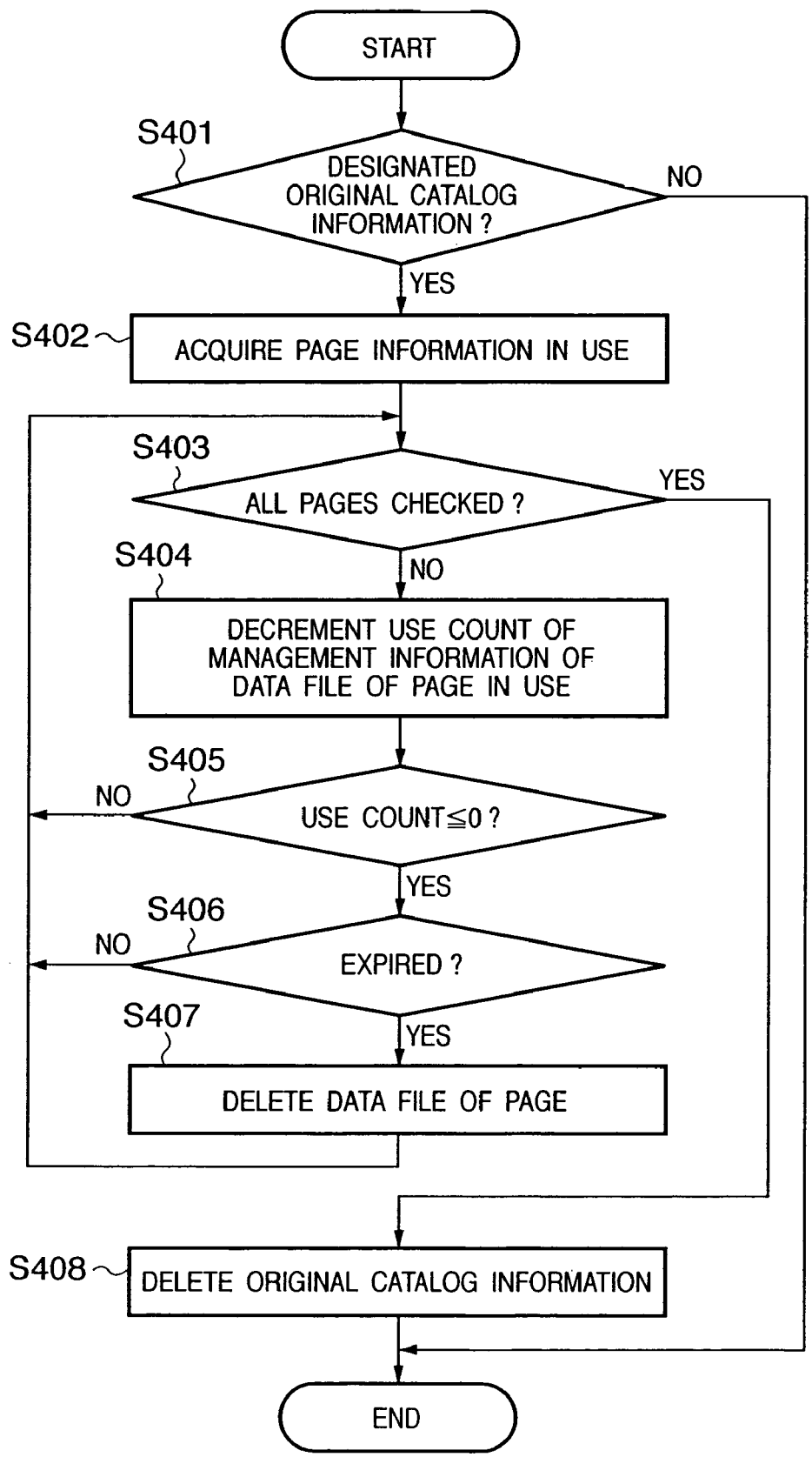
FIG. 17 is a flowchart showing original catalog information delete processing.

FIG. 17 is a flowchart showing original catalog information delete processing. In step S401, the Web application server 109 determines whether designated original catalog information is registered in the database 110. If NO in step S401, the processing is ended. If YES in step S401, the flow advances to step S402 to acquire page information in use in the original catalog. In step S403, it is determined whether all pages are checked. If NO in step S403, the flow advances to step S404 to decrement the use count in the data file of the page in use by one. In step S405, the use count is checked. If the use count is "0" or less, the flow advances to step S406 to check the expiration date of the data file. If the data file is expired, the flow advances to step S407 to delete the data file.

If it is determined in step S405 that the use count is more than "0", or it is determined in step S406 that the data file is not expired, the flow returns to step S403 to repeat the above-described processing.

The above-described processing in steps S403 to S407 is repeated. When all processing operations are ended, the flow advances to step S408 to delete the designated original catalog information. Then, the processing is ended.

Figure 23:
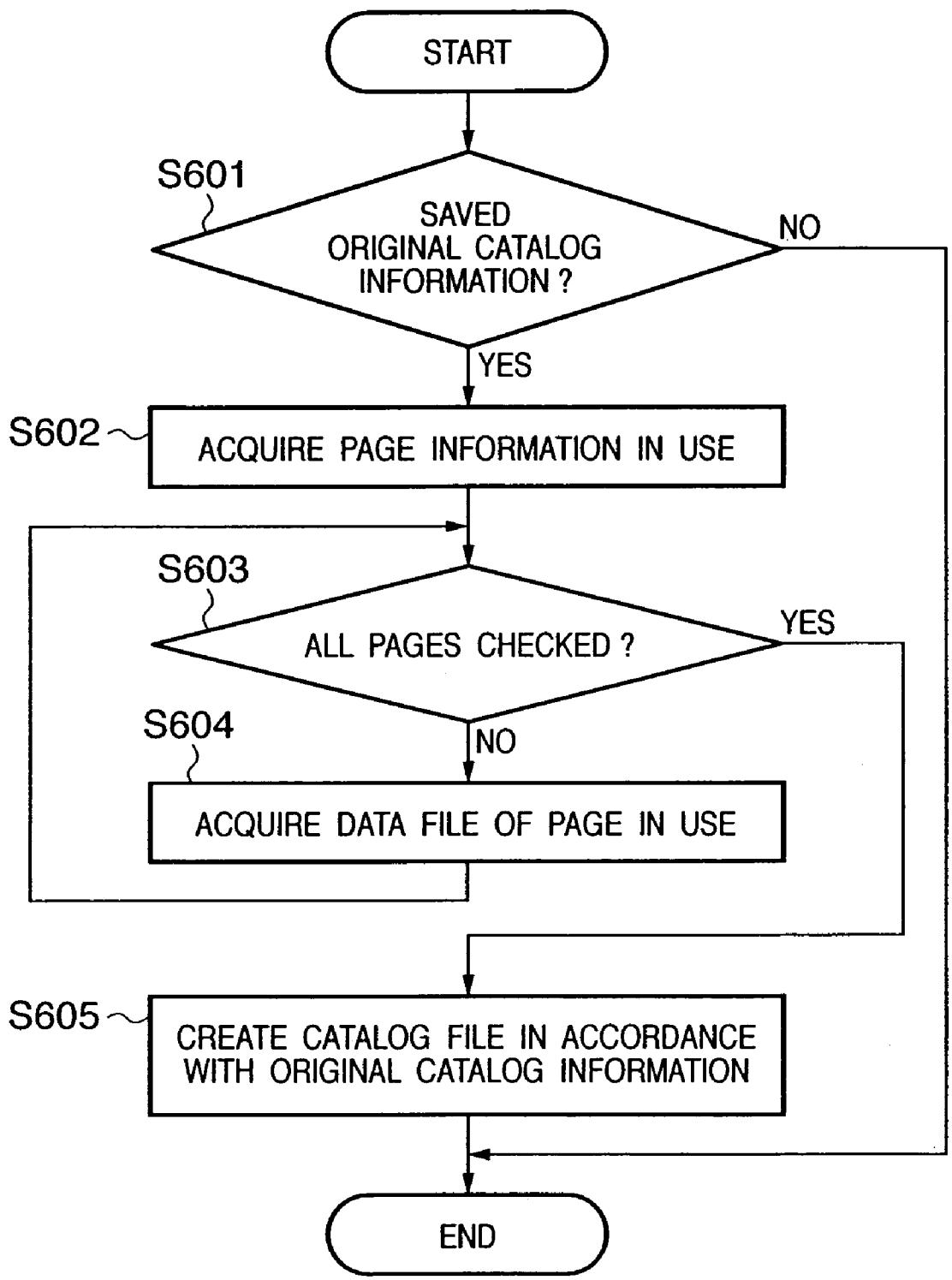
FIG. 23 is a flowchart showing original catalog information output processing.

FIG. 23 is a flowchart showing original catalog information output processing. In step S601, the Web application server 109 determines whether designated original catalog information is registered in the database 110. If NO in step S601, the processing is ended. If YES in step S601, the flow advances to step S602 to acquire page information in use. In step S603, it is determined whether all pages are checked. If NO in step S603, the flow advances to step S604 to acquire the catalog data of the page in use in the original catalog information from the database 110. The flow returns to step S603 to repeat the above-described processing.

The above-described processing in steps S603 and S604 is repeated. When all processing operations are ended, the flow advances to step S605 to connect the acquired catalog data of the respective pages in a designated order to create an original catalog file with the designated format. Then, the processing is ended.

According to this embodiment, a catalog file is managed for each page in association with merchandise information. At the time of registration, the catalog data of each page associated with one catalog file can be registered. In searching for merchandise information and outputting it, proper catalog data having a minimum and necessary size can be acquired. In searching, no unnecessary portion in the catalog file need be acquired. For this reason, the data amount can be small, and traffic on the network can be reduced. In addition, since pages which meet the requirement are displayed, the search efficiency increases.

Catalog data selected once can be saved on the database as original catalog information. When the user wants to create the same original catalog file again, he/she can easily acquire the data. For this reason, the operation efficiency can be increased. Furthermore, in acquiring the information, traffic on the network can be reduced.

On the server side, only designated page information is saved as designated original catalog information instead of saving the actually generated data file. Hence, the size of the saved data can be decreased. When an unwanted data file is deleted, information can efficiently be managed.

Since the catalog data of each page is associated with the catalog file at the time of registration, the catalog data can be output in the same structure as that of the catalog file at the time of registration, although a description thereof has been omitted in the above-described embodiment.

The present invention can be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a recording medium which records software program codes for implementing the functions of the above-described embodiment to the system or apparatus and causing the computer (or a CPU or MPU) of the system or apparatus to read out and execute the program codes stored in the recording medium.

In this case, the program codes read out from the recording medium implement the functions of the above-described embodiment by themselves, and the recording medium which stores the program codes constitutes the present invention.

As the recording medium to supply the program codes, for example, a floppy (registered trademark) disk, hard disk, optical disk, magnetooptical disk, CD-ROM, CD-R, magnetic tape, nonvolatile memory card, or ROM can be used.

The functions of the above-described embodiment are implemented not only when the readout program codes are executed by the computer but also when the OS (Operating System) running on the computer performs part or all of actual processing on the basis of the instructions of the program codes.

The functions of the above-described embodiment are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

As described above, according to the embodiment, since merchandise information of a catalog is managed in association with the catalog data of each page, merchandise information registration or search output can efficiently be executed.

Since merchandise information designated for each page is saved as an original catalog file, the database can efficiently be managed.

The present invention has been described above on the basis of the preferred embodiment. However, the present invention is not limited to the above-described embodiment, and various changes and modifications can be made within the spirit and scope defined in the appended claims.

The present invention is not limited to the catalog. For example, the above-described embodiment can be applied to other document file that comprises at least one document data, the document data including at least one page.

CLAIM OF PRIORITY

This application claims priority from Japanese Patent Application No. 2004-082931 filed on Mar. 22, 2004, which is hereby incorporated by reference herein.

What is claimed is:

1. A document management method comprising:
   a document registration step of, when a registration request of a document file comprised of a plurality of pages is received, using a computer to divide the document file into a plurality of document data, each of the plurality of document data corresponding to a page of the document file, and register the divided document data corresponding to each page in a database stored in a storage device;
   an associating step of associating search information to be used for keyword-search with each of the plurality of registered document data, wherein for each of the plurality of document data, the associated search information is information of merchandise contained in the document data of the corresponding page;
   an expiration date setting step of setting an expiration date for each document data corresponding to each page registered in the document registration step;
   a setting step of setting whether or not each of the plurality of registered document data is opened to the public on a network;
   a search step of searching for the document data corresponding to an input keyword from the plurality of registered document data which is being opened to the public, based on the search information associated in the associating step;
   a display step of displaying a plurality of thumbnail images corresponding to the document data searched in the search step;
   a selection step of selecting, based on a user instruction, a plurality of user-desired thumbnail images from the plurality of thumbnail images displayed in the display step;
   a creation step of creating one document file comprised of a plurality of user-desired document data corresponding to the plurality of user-desired thumbnail images selected in the selection step;
   a saving step of saving the created document file as an original document file together with attribute information;
   a count-up step of incrementing a counter representing presence/absence of use for each document data of each page contained in the original document file when the original document file is saved in the saving step;
   an output step of, when an output of the saved original document file is instructed by a user, acquiring, from the database, the document data used in the original document file of which the output is instructed, and outputting the acquired document data;
   a delete step of deleting the saved original document file;
   a count-down step of decrementing the counter representing the presence/absence of use for each document data of each page contained in the original document file deleted in the delete step; and
   a document data delete step of deleting, from among the registered document data corresponding to each page contained in the original document file which was deleted in the delete step, document data for which the counter is 0 and of which the set expiration date expires, wherein document data for which the counter is not 0 or of which the set expiration date does not expire is not deleted in the document data delete step.

2. The method according to claim 1, wherein the search information is information of tour merchandise contained in the document data of the corresponding page.

3. The method according to claim 1, wherein the document management method is a document management method in a network system including a server apparatus and a client apparatus which are connected through a network, and the registration request of the document file is sent from the client apparatus to the server apparatus.

4. The method according to claim 1, wherein when a format of the document file to be output is designated, the one document file is output in the designated file format.

5. The method according to claim 1, further comprising a step of executing at least one of editing, deletion, and outputting of the original document file.

6. The method according to claim 1, wherein the search information can be associated with a plurality of document data selected from a plurality of different document files.

7. The method according to claim 1, further comprising a step of displaying the document data associated with the information by using a corresponding thumbnail image.

8. The method according to claim 1, wherein said document file is a catalog file.

9. An information processing apparatus comprising:
   a storage device;
   document registration means for, when a registration request of a document file comprised of a plurality of pages is received, dividing the document file into a plurality of document data, each of the plurality of document data corresponding to a page of the document file, and registering the divided document data corresponding to each page in a database stored in the storage device;
   associating means for associating search information to be used for keyword-search with each of the plurality of registered document data, wherein for each of the plurality of document data, the associated search information is information of merchandise contained in the document data of the corresponding page;
   an expiration date setting means for setting an expiration date for each document data corresponding to each page registered by the document registration means;
   setting means for setting whether or not each of the plurality of registered document data is opened to the public on a network;
   searching means for searching for the document data corresponding to an input keyword from the plurality of registered document data which is being opened to the public, based on the search information associated by the associating means;
   display means for displaying a plurality of thumbnail images corresponding to the document data searched by the searching means;
   selecting means for selecting, based on a user instruction, a plurality of user-desired thumbnail images from the plurality of thumbnail images displayed by the displaying means;
   creation means for creating one document file comprised of a plurality of user-desired document data corresponding to the plurality of user-desired thumbnail images selected by the selecting means;

saving means for saving the created document file as an original document file together with attribute information;

a count-up means for incrementing a counter representing presence/absence of use for each document data of each page contained in the original document file when the original document file is saved by the saving means;

outputting means for, when an output of the saved original document file is instructed by a user, acquiring, from the database, the document data used in the original document file of which the output is instructed, and outputting the acquired document data;

a delete means for deleting the saved original document file;

a count-down means for decrementing the counter representing the presence/absence of use for each document data of each page contained in the original document file deleted by the delete means; and a document data delete means for deleting, from among the registered document data corresponding to each page contained in the original document file which was deleted by the delete means, document data for which the counter is 0 and of which the set expiration date expires, wherein document data for which the counter is not 0 or of which the set expiration date does not expire is not deleted by the document data delete means.

10. A network system including a server apparatus, a client apparatus, and a database, which are connected through a network, the system comprising:

a storage device;

document registration means for, when a registration request of a document file comprised of a plurality of pages is received from the client apparatus, dividing the document file into a plurality of document data, each of the plurality of document data corresponding to a page of the document file, and registering the divided document data corresponding to each page in the database stored in the storage device;

associating means for associating search information to be used for keyword-search with each of the plurality of registered document data, wherein for each of the plurality of document data, the associated search information is information of merchandise contained in the document data of the corresponding page;

an expiration date setting means for setting an expiration date for each document data corresponding to each page registered by the document registration means;

setting means for setting whether or not each of the plurality of registered document data is opened to the public on a network;

searching means for searching for the document data corresponding to an input keyword from the plurality of registered document data which is being opened to the public, based on the search information associated by the associating means;

display means for displaying a plurality of thumbnail images corresponding to the document data searched by the searching means;

selecting means for selecting, based on a user instruction, a plurality of user-desired thumbnail images from the plurality of thumbnail images displayed by the displaying means;

creation means for creating one document file comprised of a plurality of user-desired document data corresponding to the plurality of user-desired thumbnail images selected by the selecting means;

saving means for saving the created document file as an original document file together with attribute information;

a count-up means for incrementing a counter representing presence/absence of use for each document data of each page contained in the original document file when the original document file is saved by the saving means;

outputting means for, when an output of the saved original document file is instructed by a user, acquiring, from the database, the document data used in the original document file of which the output is instructed, and outputting the acquired document data;

a delete means for deleting the saved original document file;

a count-down means for decrementing the counter representing the presence/absence of use for each document data of each page contained in the original document file deleted by the delete means; and a document data delete means for deleting, from among the registered document data corresponding to each page contained in the original document file which was deleted by the delete means, document data for which the counter is 0 and of which the set expiration date expires, wherein document data for which the counter is not 0 or of which the set expiration date does not expire is not deleted by the document data delete means.

11. A computer readable storage medium storing a computer-executable program, wherein said computer-executable program is executable by a computer so as to cause the computer to execute a document management method, said computer-executable program comprising:

a document registration step of, when a registration request of a document file comprised of a plurality of pages is received, dividing the document file into a plurality of document data, each of the plurality of document data corresponding to a page of the document file, and registering the divided document data corresponding to each page in a database stored in a storage device;

an associating step of associating search information to be used for keyword-search with each of the plurality of registered document data, wherein for each of the plurality of document data, the associated search information is information of merchandise contained in the document data of the corresponding page;

an expiration date setting step of setting an expiration date for each document data corresponding to each page registered in the document registration step;

a setting step of setting whether or not each of the plurality of registered document data is opened to the public on a network;

a search step of searching for the document data corresponding to an input keyword from the plurality of registered document data which is being opened to the public, based on the search information associated in the associating step;

a display step of displaying a plurality of thumbnail images corresponding to the document data searched in the search step;

a selection step of selecting, based on a user instruction, a plurality of user-desired thumbnail images from the plurality of thumbnail images displayed in the display step;

a creation step of creating one document file comprised of a plurality of user-desired document data corresponding to the plurality of user-desired thumbnail images selected in the selection step;

a saving step of saving the created document file as an original document file together with attribute information;

a count-up step of incrementing a counter representing presence/absence of use for each document data of each page contained in the original document file when the original document file is saved in the saving step;

an output step of, when an output of the saved original document file is instructed by a user, acquiring, from the database, the document data used in the original document file of which the output is instructed, and outputting the acquired document data;

a delete step of deleting the saved original document file;

a count-down step of decrementing the counter representing the presence/absence of use for each document data of each page contained in the original document file deleted in the delete step; and a document data delete step of deleting, from among the registered document data corresponding to each page contained in the original document file which was deleted in the delete step, document data for which the counter is 0 and of which the set expiration date expires, wherein document data for which the counter is not 0 or of which the set expiration date does not expire is not deleted in the document data delete step.

* * * * *